(12) United States Patent
Yoshimura et al.

(10) Patent No.: US 10,306,098 B2
(45) Date of Patent: May 28, 2019

(54) IMAGE PROCESSING SYSTEM, IMAGE PROCESSING DEVICE AND NON-TRANSITORY READABLE RECORDING MEDIUM

(71) Applicant: Konica Minolta, Inc., Tokyo (JP)

(72) Inventors: Tomonari Yoshimura, Kyoto (JP); Atsushi Ohshima, Hyogo (JP)

(73) Assignee: Konica Minolta Inc., Tokyo (JP)

( * ) Notice: Subject to any disclaimer, the term of this patent is extended or adjusted under 35 U.S.C. 154(b) by 0 days.

(21) Appl. No.: 15/254,495

(22) Filed: Sep. 1, 2016

(65) Prior Publication Data

US 2017/0064135 A1    Mar. 2, 2017

(30) Foreign Application Priority Data

Sep. 1, 2015   (JP) .................................. 2015-171746

(51) Int. Cl.
  *H04N 1/32* (2006.01)
  *G06F 3/12* (2006.01)
  *H04N 1/327* (2006.01)

(52) U.S. Cl.
  CPC ......... *H04N 1/32614* (2013.01); *G06F 3/121* (2013.01); *G06F 3/1207* (2013.01);
  (Continued)

(58) Field of Classification Search
  CPC .................................................. H04N 1/32614
  See application file for complete search history.

(56) References Cited

U.S. PATENT DOCUMENTS

2001/0029531 A1*  10/2001  Ohta ...................... H04W 48/00
                                                       709/223
2003/0030543 A1    2/2003  Castle et al.
(Continued)

FOREIGN PATENT DOCUMENTS

| JP | H11-55731 A   | 2/1999 |
| JP | 2003-124943 A | 4/2003 |
| JP | 2007-251851 A | 9/2007 |

OTHER PUBLICATIONS

Office Action issued in corresponding Japanese Application No. 2015-171746 dated Nov. 7, 2017 (10 pages).

*Primary Examiner* — King Y Poon
*Assistant Examiner* — Michael Burleson
(74) *Attorney, Agent, or Firm* — Osha Liang LLP

(57) ABSTRACT

An image processing system includes a portable terminal and an image processing device that wirelessly communicates with the portable terminal. The portable terminal includes a first CPU that sends a connection request to the image processing device to request to establish a connection with the image processing device and that sends an execution start command to enable the image processing device to execute a job when the connection with the image processing device is established. The image processing device includes a wireless communication interface that establishes the connection with the portable terminal in response to the connection request from the portable terminal and a second CPU that receives the execution start command from the portable terminal, executes the job based on the execution start command in order of receipt, and terminates the connection with the portable terminal after the execution start command is received.

16 Claims, 13 Drawing Sheets

(52) U.S. Cl.
CPC .......... *G06F 3/1236* (2013.01); *G06F 3/1292* (2013.01); *H04N 1/32507* (2013.01); *H04N 1/32771* (2013.01); *H04N 1/32776* (2013.01); *H04N 1/32797* (2013.01); *H04N 2201/0055* (2013.01); *H04N 2201/0075* (2013.01); *H04N 2201/0094* (2013.01)

(56) References Cited

U.S. PATENT DOCUMENTS

| | | | | |
|---|---|---|---|---|
| 2006/0100000 | A1* | 5/2006 | Marples | H04B 1/1615 455/574 |
| 2013/0124737 | A1* | 5/2013 | Tachibana | H04L 12/00 709/227 |
| 2014/0218765 | A1* | 8/2014 | Sawayanagi | H04N 1/00111 358/1.15 |
| 2015/0126234 | A1* | 5/2015 | Rodriguez | G08B 13/22 455/457 |
| 2015/0186088 | A1* | 7/2015 | Iwashima | G06F 3/1254 358/1.9 |

\* cited by examiner

FIG. 4

JOB INFORMATION 55

| TERMINAL ID | USER NAME | CONNECTION STATUS | JOB TYPE | JOB ID | JOB STATUS | NOTICE INFORMATION | RECONNECTION NECESSITY |
|---|---|---|---|---|---|---|---|
| TERMINAL A | USER A | NO CONNECTION | PRINT | JOB0001 | COMPLETE NORMALLY | YES | ADMIT |
| TERMINAL B | USER B | NO CONNECTION | PRINT | JOB0105 | STANDBY | NO | NOT ADMIT |
| TERMINAL C | NO AUTHENTICATION | NO CONNECTION | SCAN | JOB0025 | ERROR OCCURED | YES | ADMIT |
| TERMINAL D | USER D | NO CONNECTION | SCAN | JOB0156 | STANDBY | YES | ADMIT |
| TERMINAL E | USER E | NO CONNECTION | PRINT | JOB0031 | EXECUTING | NO | NOT ADMIT |

55a 55b 55c 55d 55e 55f 55g 55h

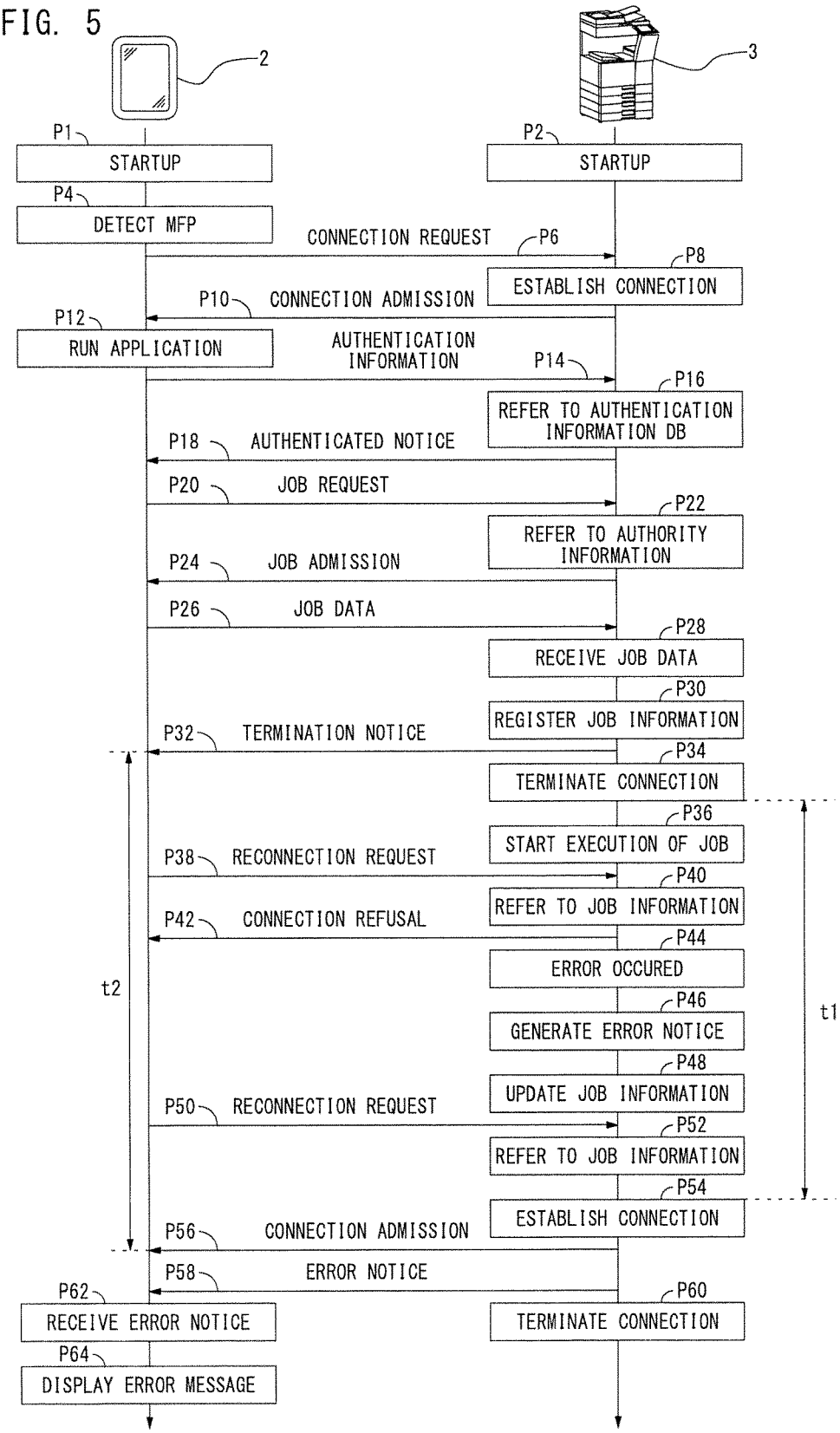

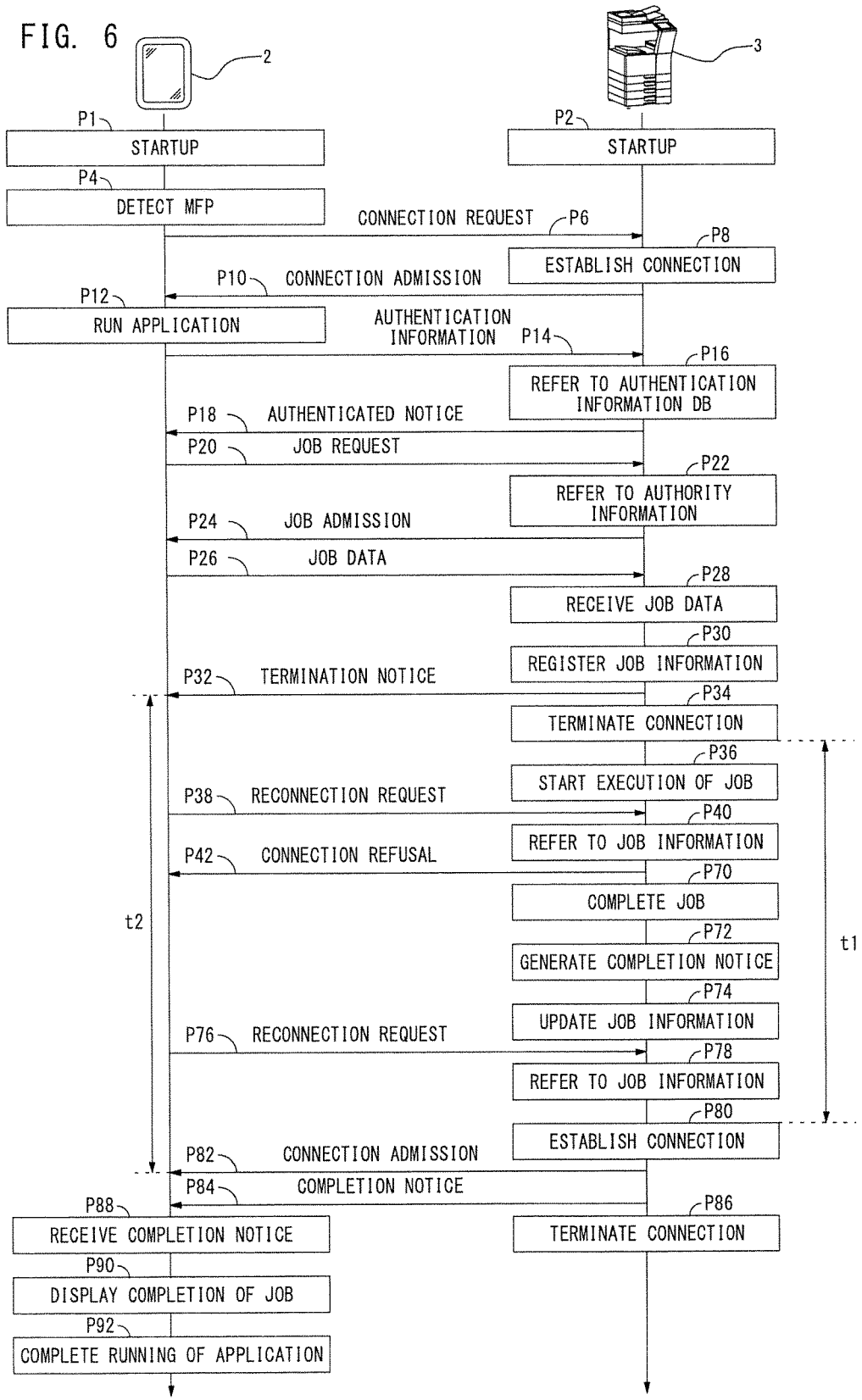

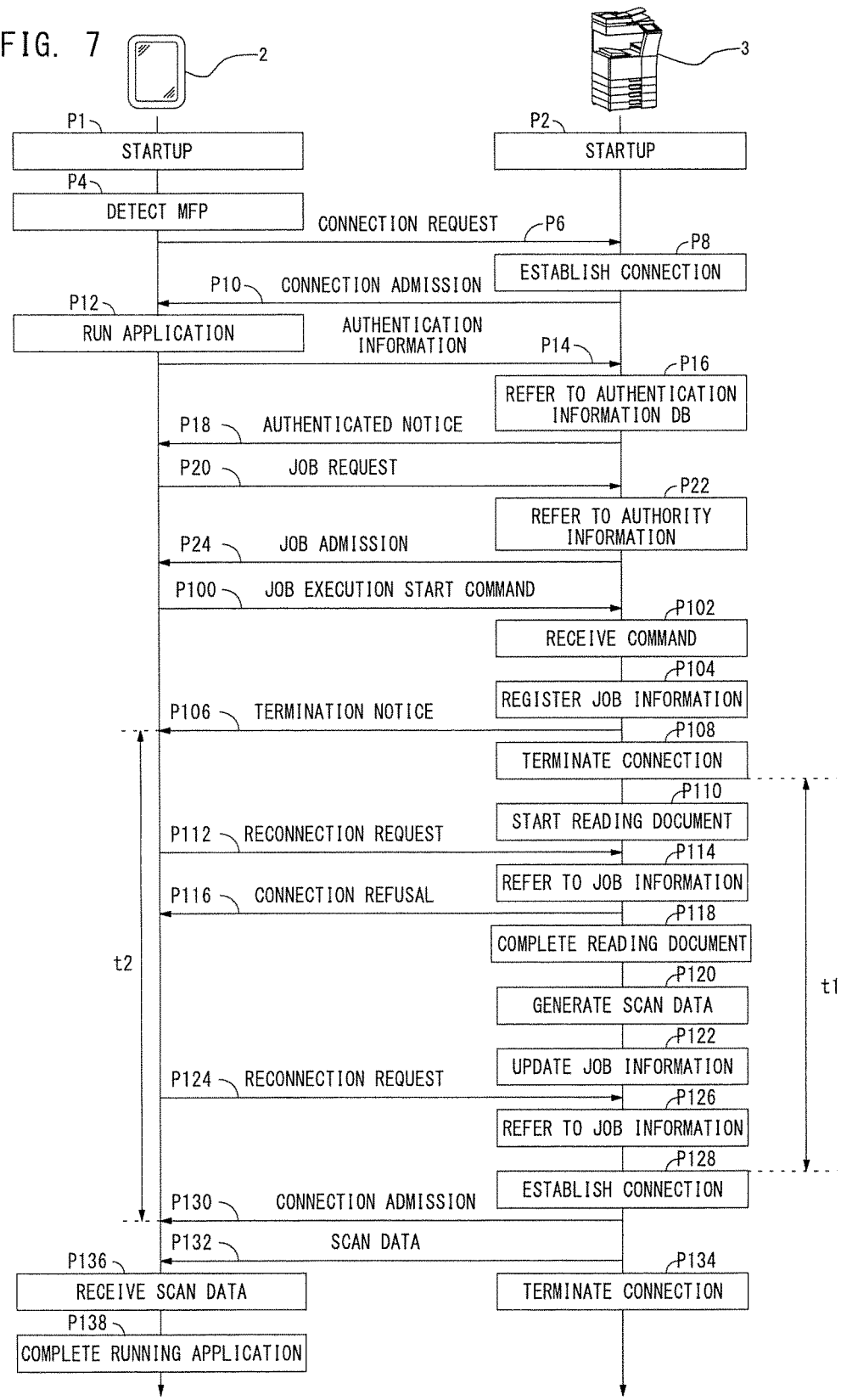

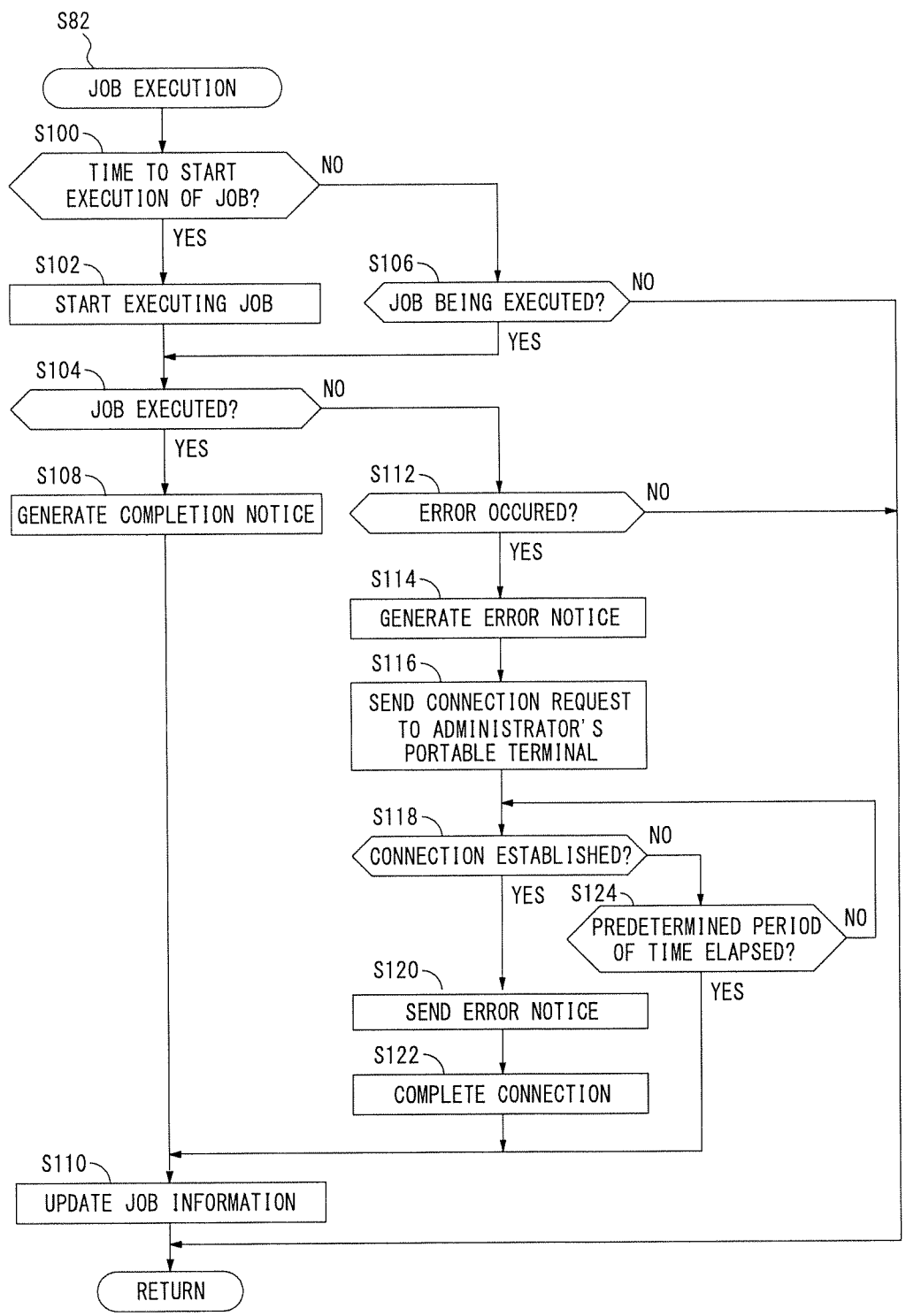

ns has reached the upper limit, the base station controller that sets a channel reservation in response to a request from the portable terminal is introduced. This known technique is introduced for example in Japanese Patent Application Laid-Open No. JP H11-55731 A. According to the known base station controller, when there is the unused channel, the portable terminal is allowed to establish the communications via the base station based on the set reservation. Thus, a user of the portable terminal who set the reservation is allowed to establish the communications by using the unused channel.

IMAGE PROCESSING SYSTEM, IMAGE PROCESSING DEVICE AND NON-TRANSITORY READABLE RECORDING MEDIUM

This application is based on the application No. 2015-171746 filed in Japan, the contents of which are hereby incorporated by reference.

BACKGROUND OF THE INVENTION

Field of the Invention

The present invention relates to an image processing system, an image processing device and a non-transitory readable recording medium. The present invention more specifically relates to an image processing system by wireless communications between a portable terminal and the image processing device.

Description of the Background Art

Portable terminals such as smartphones or tablet type computers and image processing devices that send and receive data via wireless communications are conventionally known. As sending a command to execute a job to the image processing device from the portable terminal, the job based on the command is executed at the image processing device that received the command. After the job is executed, the image processing device notifies the portable terminal that the job is complete via wireless communications. Even when an error, for instance, has occurred during the execution of the job, the image processing device sends a notice to the portable terminal via the wireless communications.

In general, until the execution of the job at the image processing device is complete and the notice to the portable terminal is sent after sending the commend to execute the job to the image processing device from the portable terminal, the connection via the wireless communications is maintained between the conventional portable terminal and image processing device. If the connection via the wireless communications between the portable terminal and the image processing device is maintained while the job is executed at the image processing device, another portable terminal is sometimes not allowed to establish communications by wireless with the image processing device. To be more specific, when an interface that is an access point for the wireless communications is built in the image processing device, there is an upper limit to the number of channels that allows the simultaneous wireless communications with multiple portable terminals. It is assumed that the number of the channels that establish the simultaneous connection between the image processing device and the multiple portable terminals reaches the upper limit. In this case, a user who would like to enable the job to be executed at the image processing device is not allowed to establish the communications by wireless with the image processing device, and cannot send the job.

On the other hand, while the job is in execution normally at the image processing device after the command is sent from the portable terminal that successfully establishes the communications by wireless with the image processing device, the data, for instance, is not sent or received between the image processing device and the portable terminal in many cases. Hence, it interferes with efficient use of a channel if it maintains the communications by wireless during the normal execution of the job at the image processing device.

Regarding a base station controller connected to a base station that relays communications of the portable terminal, when the number of the channels that establish communications has reached the upper limit, the base station controller that sets a channel reservation in response to a request from the portable terminal is introduced. This known technique is introduced for example in Japanese Patent Application Laid-Open No. JP H11-55731 A. According to the known base station controller, when there is the unused channel, the portable terminal is allowed to establish the communications via the base station based on the set reservation. Thus, a user of the portable terminal who set the reservation is allowed to establish the communications by using the unused channel.

If there is no unused channel that establishes the communications because of long communications, for instance, the portable terminal that has been set the channel reservation is not allowed to establish communications unless there is any unused channel. Hence, even though the channel reservation is set, the channels cannot be used in some cases. Even with the known technique, the channels cannot be used efficiently.

SUMMARY OF THE INVENTION

One or more embodiments of the present invention provide an image processing system, an image processing device and a non-transitory computer readable recording medium capable of efficiently using a channel for wireless communications equipped with the image processing device.

First, one or more embodiments of the present invention are directed to an image processing system comprising a portable terminal and an image processing device capable of communicating with the portable terminal by wireless.

According to one aspect of this invention, the portable terminal includes: a connection requesting part that sends a connection request to the image processing device to request to establish a connection with the image processing device; and a command transmission part that sends an execution start command to enable the image processing device to execute a job when the connection with the image processing device is established, and the image processing device includes: a wireless communication interface that establishes the connection with the portable terminal in response to the connection request from the portable terminal; a command receiving part that receives the execution start command from the portable terminal; a job executing part that executes the job based on the execution start command in order of receiving by the command receiving part; and a terminating part that terminates the connection with the portable terminal after the execution start command is received.

Second, one or more embodiments of the present invention are directed to an image processing device capable of communicating with a portable terminal by wireless.

According to one aspect of this invention, the image processing device comprises: a wireless communication interface that establishes a connection with the portable terminal in response to a connection request from the portable terminal; a command receiving part that receives an execution start command from the portable terminal to start an execution of a job; a job executing part that executes the job based on the execution start command in order of receiving by the command receiving part; and a terminating part that terminates the connection with the portable terminal after the execution start command is received.

Third, one or more embodiments of the present invention are directed to a non-transitory computer readable recording medium storing a program to be executed by an image processing device that is capable of communicating with a portable terminal by wireless.

According to one aspect of this invention, execution of the program by the image processing device causing the image processing device to execute the steps of: (1) establishing a connection with the portable terminal in response to a connection request from the portable terminal; (2) receiving an execution start command from the portable terminal to start execution of a job; (3) executing the job based on the execution start command in order of receiving in the step (2); and (4) terminating the connection with the portable terminal after the execution start command is received.

BRIEF DESCRIPTION OF THE DRAWINGS

FIG. 4 shows an example of job information according to one or more embodiments of the invention;

FIG. 5 shows an example of a timing chart for executing a print job according to one or more embodiments of the invention;

FIG. 6 shows an example of a timing chart for executing the print job according to one or more embodiments of the invention;

FIG. 7 shows an example of a timing chart for executing a scan job according to one or more embodiments of the invention;

FIG. 13 is a detailed flow diagram explaining an exemplary sequential procedure of a job execution according to one or more embodiments of the invention.

DETAILED DESCRIPTION

Figure 1:
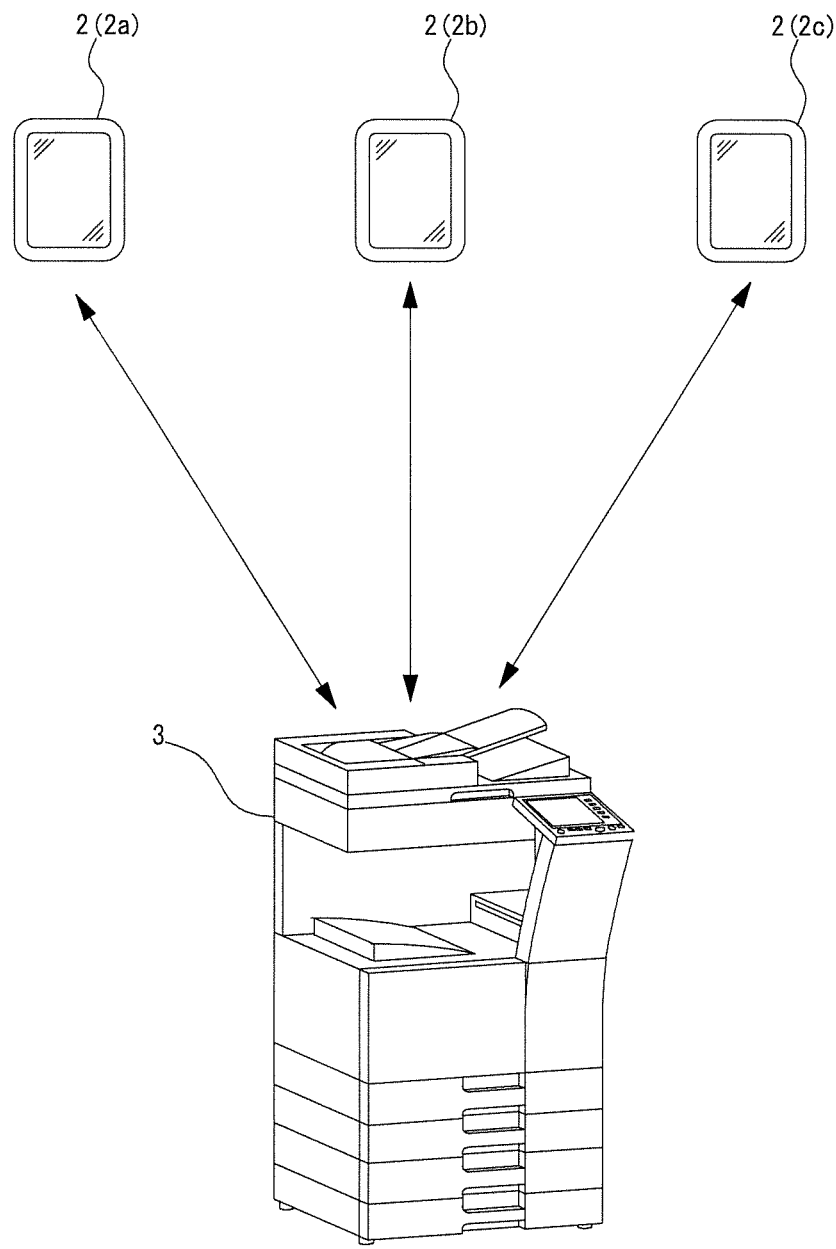
FIG. 1 shows an exemplary configuration of an image processing system according to one or more embodiments of the invention.

Embodiments of the present invention are described in detail below with reference to figures. In the description given below, those elements which are shared in common among figures are represented by the same reference numerals, and these elements are not discussed repeatedly for the same description.

FIG. 1 shows an exemplary configuration of an image processing system 1 according to one or more embodiments of the invention. The image processing system 1 comprises a portable terminal 2 and an image processing device 3. The portable terminal 2 and the image processing device 3 are capable of sending and receiving data to and from each other wirelessly. The portable terminal 2 is an information processing device that has a wireless communication function such as a smartphone or a tablet type computer. The portable terminal 2 includes an application program that is capable of generating and transmitting a job to enable the image processing device 3 to perform a predetermined process in addition to an operating system (OS).

The image processing device 3 is constructed by a device such as one of MFPs (Multi Functional Peripherals) that includes functions such as a print function and a scan function. The image processing device 3 includes a wireless communication interface 32 (see FIG. 3) to establish communication by wireless with the portable terminal 2. The image processing device 3 has a certain amount of multiple channels like 6 to 10 for wireless communications, and is capable of connecting with more than one portable terminal 2 at the same time by wireless. When the image processing device 3 establishes connection with each of the multiple portable terminals 2a, 2b and 2c at the same time, it is allowed to receive a job relating to the print function or the scan function from each portable terminal 2. After receiving the job from the portable terminal 2a, 2b or 2c, the image processing device 3 executes the job in the chronological order, most recent received one first in principal, and puts the other jobs in a standby state. The image processing device 3 is capable of connecting to the portable terminals 2 up to the upper limit which is the number of the channels at the same time. According to one or more embodiments of the invention, the image processing device 3 secures a predetermined number of unused channels to establish connection in response to a reconnection request which is described later. It is assumed for example the connection is established using more than the predetermined number of the channels of all channels. In this case, the image processing device 3 refuses a newly received connection request.

After detecting the image processing device 3 within a certain distance from itself, the portable terminal 2 sends a connection request to request the image processing device 3 to establish the connection. As an example, the image processing device 3 emits electric waves that can be received within a certain distance from itself to the portable terminal 2. The portable terminal 2 is allowed to receive electric waves emitted from the image processing device 3 with a function in the OS. After receiving electronic waves emitted from the image processing device 3, the OS of the portable terminal 2 detects the image processing device 3 as a destination with which it is allowed to communicate wirelessly. In the example of FIG. 1, a user who carries the portable terminal 2a walks close to the image processing device 3, and the portable terminal 2a detects the image processing device 3 within the certain distance from itself as the destination for the communications by wireless. It is assumed that the user designates the image processing device 3 as the destination for the communications by wireless. In this case, the OS of the portable terminal 2a sends the connection request to the image processing device 3. If no access point other than the image processing device 3 is detected as the access point with which it is allowed to communicate wirelessly, the OS of the portable terminal 2a may automatically send the connection request when detecting the image processing device 3.

When receiving the connection request from the portable terminal 2a, the image processing device 3 allows the connection to the connection request if there is the unused channel. The image processing device 3 then establishes connection with the portable terminal 2a. Similarly, when receiving the connection request from the portable terminal 2b, the image processing device 3 allows the connection to the connection request if there is the unused channel, and then establishes the connection with the portable terminal 2b. It is assumed for example that the connection request is received from the portable terminal 2c. If more than the predetermined number of the channels of all channels equipped with the image processing device 3 has been occupied to establish the connection with the portable terminal 2 in this case, the image processing device 3 refuses the connection request from the portable terminal 2c. To be more specific, if fewer than the predetermined number of the channels have been occupied to establish the connection, the image processing device 3 allows the connection request from the portable terminal 2, and establishes the connection. On the other hand, if more than the predetermined number of the channels has been occupied to establish the connection, the image processing device 3 refuses the connection request, and does not establish connection with the portable terminal 2 by wireless.

It is assumed that the user gives an instruction to run an application by operating the portable terminal 2a as the connection between the image processing device 3 and the portable terminal 2a is established. In this case, an application program is run on the portable terminal 2a and the application that works with the image processing device 3 may be run. After the application is run on the portable terminal 2a, the user is allowed to configure settings to enable the image processing device 3 to perform a predetermined process such as print and/or scan by operating the portable terminal 2a. More specifically, after the application is run on the portable terminal 2a, the application communicates with the image processing device 3 by wireless, and enables a screen to execute the job such as a print and/or a scan job at the image processing device 3 to be displayed on a display unit 19 (see FIG. 2) of the portable terminal 2. The application also receives the operation to configure the settings about the job by the user, and generates the job to be executed at the image processing device 3 in response to the inputs by the user through a manipulation unit 17 (see FIG. 2). After generating the job, the application sends an execution start command to enable the portable terminal 2a to request the image processing device 3 to start execution of the job in response to the user instruction to execute. For the print job, for instance, image data such as that of a document to print is attached to the execution start command sent at this point. In response to receiving the execution start command of the job from the portable terminal 2a, the image processing device 3 starts executing the job based on the command.

When the application is run on the portable terminal 2a, the OS of the portable terminal 2a may have already been accessed to the access point different from the image processing device 3. In such a case, the application requests the OS to establish the connection with the image processing device 3. The OS of the portable terminal 2 then releases the access point to that it has been connected and sends the connection request to the image processing device 3, thereby establishing connection with the image processing device 3 within the certain distance.

It is assumed that the connection between the portable terminal 2a and the image processing device 3 has not been established when the application is run, which is different from the above case. In this case, the application may search for the image processing device 3 within the certain distance from the portable terminal 2a instead of the OS and send the connection request to the image processing device 3 when detecting the image processing device 3. After the connection between the portable terminal 2a and the image processing device 3 is established as the result, the application is allowed to send the job generated based on the user setting operation to the image processing device 3.

In response to receiving the print job from the portable terminal 2a, for example, the image processing device 3 temporarily terminates the connection with the portable terminal 2a. The image processing device 3 then executes the received print job. If the image processing device 3 is executing another print job when receiving the print job, it manages the received print job as a standby job. After execution of the print job in execution is complete, the image processing device 3 reads and executes the standby job.

After receiving the print job from the portable terminal 2a, the image processing device 3 temporarily terminates the connection with the portable terminal 2a. As a result, at least one channel for the image processing device 3 to communicate with the portable terminal 2 can be used. Another portable terminal 2b sends the connection request to the image processing device 3 to send the new job to the image processing device 3. In this case, the image processing device 3 is allowed to establish connection with another portable terminal 2b by using the unused channel.

When the connection with the image processing device 3 is terminated, the portable terminal 2a sends the reconnection request the image processing device 3 to establish the connection. In response to receiving the reconnection request from the portable terminal 2a, the image processing device 3 confirms an execution status of the print job received from the portable terminal 2a. More specifically, the image processing device 3, for example, confirms if any certain event is happening like when the execution of the print job is complete and/or when there is an error during the execution of the print job. If the certain event is happening, the image processing device 3 determines that a notice to the portable terminal 2a is necessary and admits the reconnection request from the portable terminal 2a. The image processing device 3 then establishes the connection with the portable terminal 2a again. No event may be happening by confirming the execution status of the print job received from the portable terminal 2a and the notice to the portable terminal 2a may not be necessary. In this case, the image processing device 3 refuses the reconnection request from the portable terminal 2a. The connection between the image processing device 3 and the portable terminal 2a is kept terminated.

After establishing the connection with the portable terminal 2a again in response to the reconnection request from the portable terminal 2a, the image processing device 3 sends the necessary notice to the portable terminal 2a. After sending the notice to the portable terminal 2a, the image processing device 3 terminates the connection with the portable terminal 2a. The portable terminal 2 received the notice from the image processing device 3 displays a screen depending on the notice on the display unit 19 of FIG. 2. The image processing device 3 establishes the connection with the portable terminal 2a if the notice to the portable terminal 2a is necessary, and if the notice is not necessary, the image processing device 3 terminates the connection with the portable terminal 2a. Thus, the connection is established when it is required to send and receive the data, for instance, between the portable terminal 2a and the image processing device 3. While the data, for instance, is not sent and received, the connection is terminated, resulting in enhanced efficient use of the channel.

Figure 2:
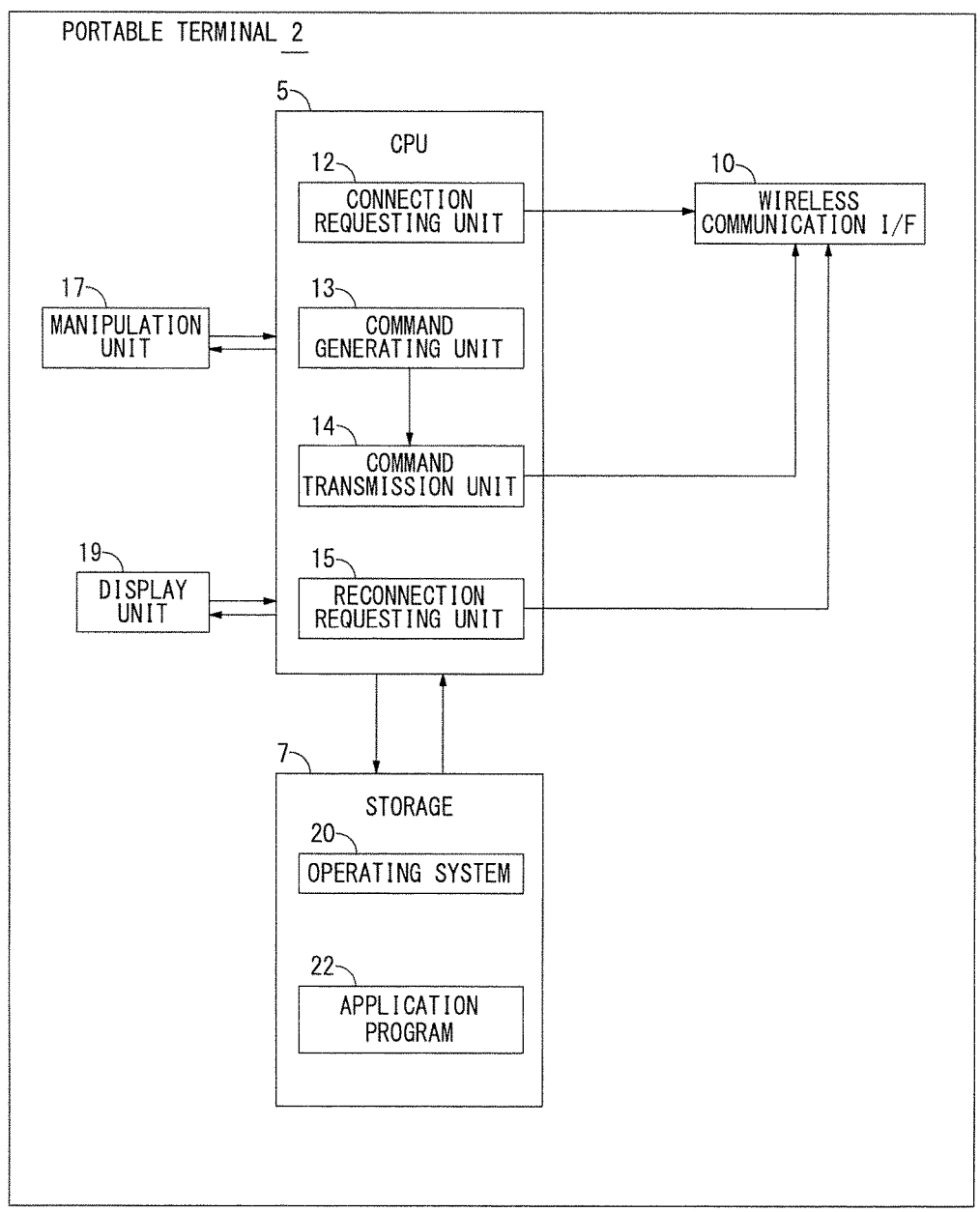
FIG. 2 is a block diagram showing an example of a functional structure of a portable terminal configuring the image processing system according to one or more embodiments of the invention.

Detailed structures of the above-described portable terminal 2 and the image processing device 3 are explained below. FIG. 2 is a block diagram showing an example of a functional structure of the portable terminal 2 according to one or more embodiments of the invention.

The portable terminal 2 includes a CPU 5, a storage 7, a wireless communication interface 10, the manipulation unit 17 and the display unit 19. The wireless communication interface 10 is an interface that establishes communications with the image processing device 3 and/or other external devices by wireless. The user inputs through the manipulation unit 17, and various types of information are displayed to the user on the display unit 19. The display unit 19 is formed from a device such as a liquid crystal display that has a predetermined screen size, for instance, and is capable of displaying a variety of screens. The manipulation unit 17 is formed with parts such as touch sensors arranged on the screen of the display area of the display unit 19, for example. The user inputs by operating the manipulation unit 17 with referring to the screen displayed on the display unit 19, thereby giving an instruction on execution of the job to the image processing device 3 and/or configuring the settings about execution of the job. An operating system 20, an application program 22 and connection history information 23 are stored in the storage 7. The application program 22 is run to execute the job at the image processing device 2, and a history of connection to the external device is recorded as the connection history information 23. Once the portable terminal 2 is started up, the operating system 20 in the storage 7 is read and executed. The CPU 5 then serves as a connection requesting unit 12 that sends the connection request to request the image processing device 3 to establish the connection. In response to detecting the radio waves emitted from the image processing device 3 to the portable terminal 2, the connection requesting unit 12, for example, refers to the connection history information 23 in the storage 7. If the history of connection with the image processing device 3 is recorded as the connection history information 23, the connection requesting unit 12 recognizes that the image processing device 3 is the device capable of communicating by wireless. When the wireless communication interface 10 is not connecting to another access point, the connection requesting unit 12 sends the connection request to the image processing device 3 and establishes the connection with the image processing device 3.

When the wireless communication interface 10 is connecting to another access point, the connection requesting unit 12 maintains the connection to another access point without sending the connection request to the image processing device 3. Even when maintaining the connection to another access point, the connection requesting unit 12 may notify the user that the image processing device 3 with which it is allowed to communicate by wireless is within the certain distance. After detecting an instruction to connect to the image processing device 3, the connection requesting unit 12 enables the wireless communication interface 10 to release the connection with another access point, and sends the connection request to the image processing device 3 from the wireless communication interface 10.

It is assumed that the application program 22 is run and the application is run on the portable terminal 2 as the wireless communication interface 10 is not establishing the connection with the image processing device 3. In this case, the connection requesting unit 12 sends the connection request to the image processing device 3 via the wireless communication interface 10 in response to the request from the application. The connection requesting unit 12 may be established as one of the functions of the application not as the operating system 20. In this case, when the application program 22 is run and the CPU 5 serves as the connection requesting unit 12, the connection requesting unit 12 sends the connection request to the image processing device 3.

The application program 22 is run in response to the input through the manipulation unit 17 by the user and the application is run on the portable terminal 2a, then the CPU 5 serves as a command generating unit 13, a command transmission unit 14 and a reconnection requesting unit 15. The command generating unit 13 generates the job to be executed at the image processing device 3 and the execution start command of the job in response to the input through the manipulation unit 17 by the user. When the connection with the image processing device 3 is established, the command transmission unit 14 sends the execution start command generated by the command generating unit 13 to the image processing device 3. For the print job, for instance, the command transmission unit 14 sends document data to print together with the execution start command of the print job. For the scan job, for instance, the command transmission unit 14 sends the execution start command of the scan job. Once receiving the execution start command of the scan job, the image processing device 3 starts reading the document placed on a position of the document by the user and starts scanning.

The reconnection requesting unit 15 sends the reconnection request on a periodical basis to request the image processing device 3 to establish the connection after the execution start command is sent to the image processing device 3 by the command transmission unit 14 and the connection is terminated by the image processing device 3 that received the execution start command. It is assumed that the command transmission unit 14 sends the execution start command to the image processing device 3, and the image processing device 3 receives the execution start command. The image processing device 3 then terminates the connection with the portable terminal 2. After terminating the connection with the portable terminal 2, the image processing device 3 according to one or more embodiments of the invention sends a termination notice to the portable terminal 2 to notify that the connection is terminated. When receiving the termination notice, the reconnection requesting unit 15 sends the reconnection request to the image processing device 3 on a periodical basis. The reconnection requesting unit 15 generates the reconnection request by adding identification information to the connection request that requests the image processing device 3 to establish the connection. The identification information identifies the job such as a job ID, for instance. The job ID is assigned when the execution start command is generated by the command generating unit 13. After the connection with the image processing device 3 is established in response to the reconnection request and the notice is received by the image processing device 3, the portable terminal 2 displays the screen according to the notice on the display unit 19.

Figure 3:
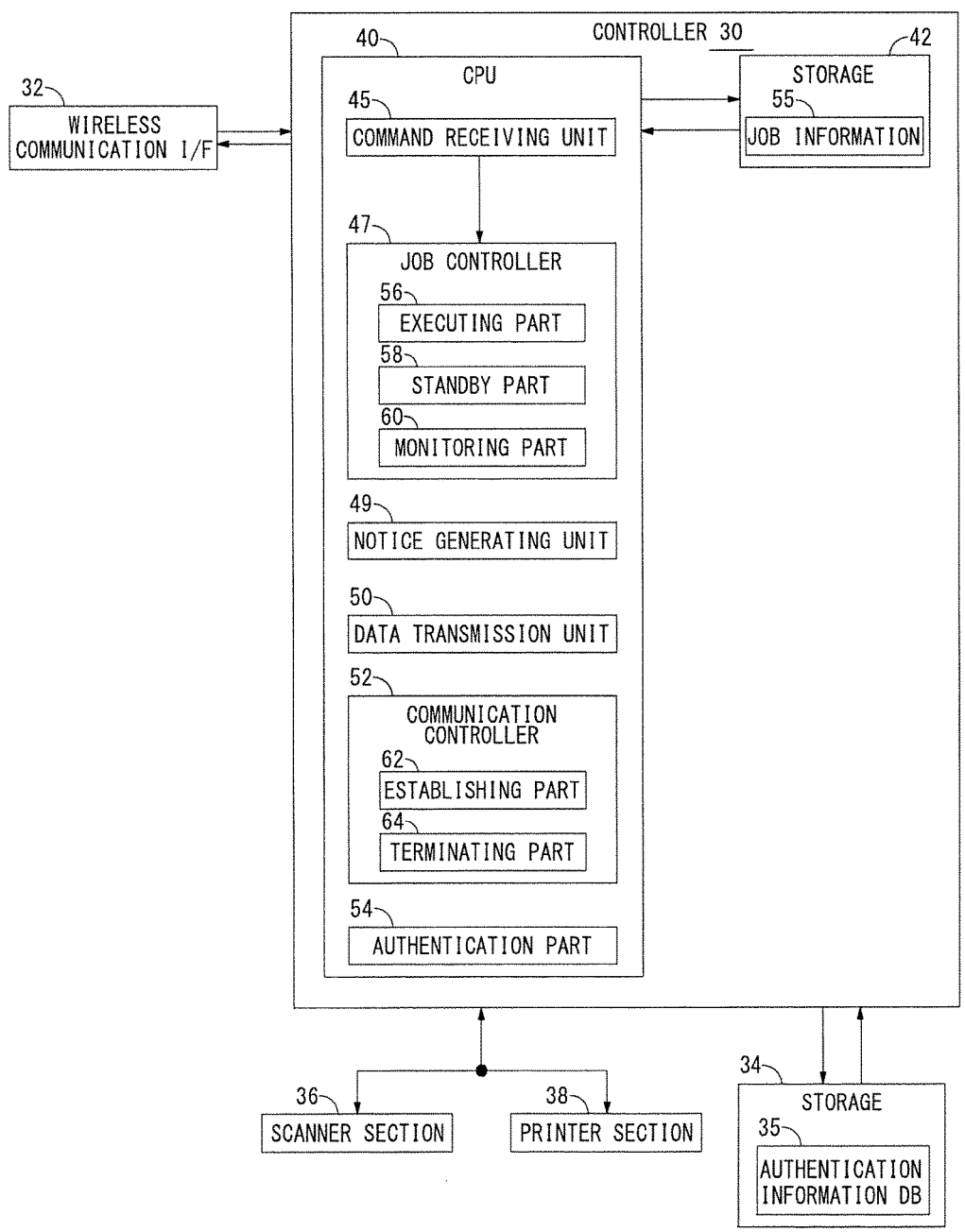
FIG. 3 is a block diagram showing an example of a hardware structure and that of a functional structure of an image processing device configuring the image processing system according to one or more embodiments of the invention.

The structure of the image processing device 3 is explained next. FIG. 3 is a block diagram showing an example of a hardware structure and that of a functional structure of the image processing device 3 according to one or more embodiments of the invention. The image processing device 3 includes a controller 30, the wireless communication interface 32, a storage 34, a scanner section 36 and a printer section 38. The controller 30 controls operations of the image processing device 3. The wireless communication interface 32 is the interface for communicating with the portable terminal 2 by wireless. The storage 34 is formed from a nonvolatile storage device such as a hard disk drive, for example. The scanner section 36 executes the scan job, and the printer section 38 executes the print job. The controller 30 includes a CPU 40 and a storage 42 formed from a nonvolatile storage device such as a memory, for example.

The wireless communication interface 32 includes multiple channels and establishes communication with the single portable terminal 2 by wireless using each channel. A program stored in the storage 34, for instance, is executed so that the CPU 40 serves as a command receiving unit 45, a job controller 47, a notice generating unit 49, a data transmission unit 50 and a communication controller 52. The command receiving unit 45 receives the execution start command from the portable terminal 2, and the job controller 47 controls the execution of the job according to the execution start command received by the command receiving unit 45. The notice generating unit 49 generates a notice relating to the job to the portable terminal 2 depending on the status of the execution of the job by the job controller 47, and the data transmission unit 50 sends the data generated about the job to the portable terminal 2. The communication controller 52 controls to establish or terminate the communication with the portable terminal 2.

The command receiving unit 45 receives the execution start command from the portable terminal 2. After the command receiving unit 45 receives the execution start command, the job controller 47 starts execution of the job in response to the received command if it's not during the execution of another job. If it's during the execution of another job, the job controller 47 puts the received command into a standby state until a timing to start the execution of the job. In response to receiving the execution start command, the command receiving unit 45 notifies the communication controller 52 of the receipt of the execution start command. When receiving the notice from the command receiving unit 45, the communication controller 52 terminates the connection with the portable terminal 2 that has sent the execution start command.

After receiving the execution start command, the command receiving unit 45 generates job information 55 relating to a progress of the job corresponding to the execution start command and stores the generated job information 55 in the storage 42. The job information 55 shows the progress of the job after the execution start command is received by the command receiving unit 45. The job information 55 is updated by a monitoring part 60 of the job controller 47 as described above. The job information 55 is also deleted from the storage 42 after the job is executed and a completion notice is sent to the portable terminal 2. FIG. 4 shows an example of the job information 55 stored in the storage 42 according to one or more embodiments of the invention. A terminal ID 55a corresponds to the portable terminal 2 that has sent the execution start command, a user name 55b corresponds to the user authenticated by an authentication part 54, a connection status 55c showing a status of the connection with the portable terminal 2, a job type 55d showing a type of the received job, a job ID 55e corresponding to the received job, a job status 55f, notice information 55g and reconnection necessity information 55h are registered as the job information 55. A progress of the job is shown as the job status 55f, and whether or not there is the notice that should be sent to the portable terminal 2 is shown as the notice information 55g. The reconnection necessity information 55h shows whether or not to admit the reconnection.

After receiving the execution start command, the command receiving unit 45 generates the job information 55 that includes the terminal ID 55a corresponding to the portable terminal 2 that has sent the execution start command, the job type 55d corresponding to the type of the job and the job ID 55e corresponding to the job.

The job controller 47 further includes an executing part 56, a standby part 58 and the monitoring part 60. The executing part 56 enables the execution of the job in response to the execution start command received by the command receiving unit 45. The standby part 58 puts the execution start command received by the command receiving unit 45 into the standby state when another job is in execution by the executing part 56 or the execution of the job by the executing part 56 is unavailable because of an error, for instance. The monitoring part 60 monitors the progress or the standby state of the job. The executing part 56 enables the scanner section 36 or the printer section 38 to execute the job in the chronological order, most recent received one first, in response to the execution start command received by the command receiving unit 45. If a turn for the execution start command comes, the executing part 56 starts the execution of the job. For the scan job, for example, the executing part 56 enables the scanner section 36 to read the document and generated scan data. For the print job, for example, the executing part 56 enables the printer section 38 to form an image corresponding to document data and print the image on a printing medium such as a printing sheet.

The standby part 58 puts the job corresponding to the newly received execution start command by the command receiving unit 45 into the standby state depending on the progress of the job by the executing part 56. When the execution start command is received by the command receiving unit 45, the executing part 56 starts the execution of the job in response to the execution start command. It is assumed for example the execution of another job has been started by the executing part 56 or a process such as an image stabilization is performed when the execution start command is received by the command receiving unit 45. In such a case, the standby part 58 puts the job corresponding to the unexecuted execution start command into the standby state in order of receiving by the command receiving unit 45. To be more specific, the standby part 58 puts the other jobs into the standby state while the earlier job is executed by the executing part 56. Also, the standby part 58 puts all the jobs into the standby state while the process such as the image stabilization is performed.

The monitoring part 60 monitors the progress of the job executed by the executing part 56. The monitoring part 60 always monitors while the execution of the job is executed by the executing part 56. The monitoring part 60 determines whether or not a predetermined situation such as completion of the execution of the job or the error during the execution of the job, for example, has occurred. When detecting the occurrence of the predetermined situation, the monitoring part 60 sends a notice to the notice generating unit 49 to notify the occurrence of the predetermined situation. The monitoring part 60 monitors the standby state of the job put into the standby state by the standby part 58, and monitors which job is currently in the standby state. The monitoring part 60 monitors the progress and/or standby state of the job, and updates the job information 55 in the storage 42 according to a monitoring result. When the predetermined situation such as the completion of the execution of the job or the occurrence of the error occurs, the monitoring part 60 updates the job information 55 in the storage 42 by applying the job status 55f showing the predetermined situation.

The notice generating unit 49 generates the notice relating to the job based on the progress of the job monitored by the monitoring part 60. After the monitoring part 60 detects that the execution of the job is complete, for example, the notice generating unit 49 generates a job completion notice to send to the portable terminal 2. After the monitoring part 60 detects that the error has occurred during the execution of the job, for example, the notice generating unit 49 generates an error notice to send to the portable terminal 2. Alternatively, the notice generating unit 49 may refer to the job information 55f in the storage 42 at a predetermined time interval, and generate the notice to the portable terminal 2 based on the progress shown in the job status 55f. The notice generating unit 49 generates the notice to the portable terminal 2 and stores the generated notice until it is sent. After generating the notice to the portable terminal 2, the notice generating unit 49 updates the notice information 55g in the job information 55.

The notice generating unit 49 may generate the error notice to the portable terminal 2 corresponding to the standby job when the error is occurred during the execution of the job corresponding to the execution start command received from one of the portable terminals 2. It is assumed for example the notice generating unit 49 detects that the error has occurred during the execution of the scan job received from a terminal C shown in FIG. 4. In this case, the notice generating unit 49 generates the notice to notify terminals B and D that the error has occurred during the execution of the scan job. The terminal B is a device that sent the print job which is in the standby state as shown in the job status 55f, and the terminal D is a device that sent the scan job which is in the standby state as shown in the job status 55f. The users who use the terminals B and D receive the notice so that it is expected that the users may take some measures to solve the error occurred at the image processing device 3. The notice generating unit 49 may generate the notice to the corresponding portable terminal 2 which sent the job the same type as the job about which the error occurs of the portable terminals 2 sent the standby jobs. In the example of FIG. 4, the error has occurred during the execution of the scan job. In this case, the notice generating unit 49 may generate the notice to notify a terminal D which sent the scan job in the standby state that the error has occurred during the execution of the scan job. The user who uses the terminal D received the notice is allowed to know the execution of the scan job at the image processing device 3 that he or she instructed may delay. In order to avoid the delay in the execution of the scan job at the image processing device 3, the user who uses the terminal D takes some measures to solve the currently occurred error. Thus, the error currently occurred at the image processing device 3 may be solved.

By referring back to FIG. 3, the data transmission unit 50 sends the data relating to the job generated after the execution start command is received by the command receiving unit 45 to the portable terminal 2 as the connection with the portable terminal 2 is established. The data relating to the job sent to the portable terminal 2 from the data transmission unit 50 includes the notice generated by the notice generating unit 49 and/or the scan data generated by execution of the scan job by the executing part 56. The notice to the portable terminal 2 generated by the notice generating unit 49 may be stored. In this case, the data transmission unit 50 sends the notice to the portable terminal 2 after the connection between the image processing device 3 and the portable terminal 2 is established. After sending the notice to the portable terminal 2, the data transmission unit 50 updates the notice information 55g in the job information 55. In the example of FIG. 4, the data transmission unit 50 updates the notice information 55g to which showing "NO." The scan job is executed and the scan data is generated after the connection with the portable terminal 2 that sent the scan job is established. In this case, the data transmission unit 50 sends the scan data to the portable terminal 2.

The communication controller 52 includes an establishing part 62 and a terminating part 64. The establishing part 62 establishes the connection with the terminal device 2, and the terminating part 64 terminates the connection with the terminal device 2. The establishing part 62 establishes the connection with the terminal device 2 in response to the connection request from the portable terminal 2. It is assumed that the data is yet to be sent by the data transmission unit 50 when the reconnection request is received from the portable terminal 2. In such a case, the establishing part 62 establishes the connection with the portable terminal 2 in response to the reconnection request from the portable terminal 2. When receiving the reconnection request, the notice information 55g corresponding to the portable terminal 2 that sent the reconnection request in the job information 55 may show "YES." In this case, the establishing part 62 establishes the connection with the portable terminal 2 in response to the reconnection request. If the notice has not been generated by the notice generating unit 49, the establishing part 62 refuses the connection in response to the reconnection request from the portable terminal 2. The notice information 55g may show "NO." In this case, the establishing part 62 refuses the connection in response to the reconnection request from the portable terminal 2. Even when the notice information 55g corresponding to the portable terminal 2 that sent the reconnection request shows "NO," the job type 55d shows it is the scan job and the job status 55f shows that the execution of the scan job is complete normally. In this case, the establishing part 62 establishes the connection in response to the reconnection request from the portable terminal 2. After the connection is established, the data transmission unit 50 sends the scan data to the portable terminal 2.

The establishing part 62 identifies the reconnection request and the connection request to send the new job based on identification information included in the reconnection request. The identification information includes the job ID attached to the connection request at the portable terminal 2. In response to receiving the connection request from the portable terminal 2, the establishing part 62 reads the job ID attached to the connection request. The establishing part 62 refers to the job information 55 and determines if there is the job information 55 relating to the job that has the job ID that matches with the read job ID. If there is the job that has the job ID matches with the one attached to the received connection request, the establishing part 62 determines the received connection request is the reconnection request. After determining that the received connection request is the reconnection request, the establishing part 62 establishes the connection in response to the connection request when the notice information 55g shows "YES" as described above, or the execution of the scan job is complete normally.

If there is no job that has the job ID matches with the one attached to the received connection request, the establishing part 62 determines the received connection request is the connection request to send the new job not the reconnection request. When determining the received connection request is the connection request to send the new job, the establishing part 62 refuses the connection request if the connection with the portable terminal 2 is established by using more than the predetermined number of channels of all channels included in the wireless communication interface 32. It is assumed for example each of six channels of eight channels is used to establish the connection with the portable terminal 2. In this case, the establishing part 62 refuses the connection request. On the other hand, the establishing part 62 establishes the connection in response to the connection request if the reconnection request is received. Thus, the channel for the reconnection request received from the portable terminal 2 may be saved. When the data relating to the job such as the notice to the portable terminal 2 is stored in the image processing device 3 without being sent, the connection is established in response to the reconnection request so that the data may be sent to the portable terminal 2 smoothly. The connection request may be received from the portable terminal 2 used by the certain user such as an administrator. In this case, the establishing part 62 establishes the connection in response to the connection request even if the connection has already been established using the predetermined number of the channels (six channels in the above example). The establishing part 62 refers to information stored in advance in the storage 42 such as the terminal ID of the portable terminal 2 used by the certain user such as the administrator. The establishing part 62 then establishes the connection in response to the connection request if the connection request from the portable terminal 2 used by the certain user such as the administrator is received.

The terminating part 64 terminates the connection with the portable terminal 2. After receiving the execution start command from the portable terminal 2, the terminating part 64 terminates the connection with the portable terminal 2. The establishing part 62 establishes the connection in response to the connection request, and the execution start command to execute the job is sent from the portable terminal 2. The command receiving unit 45 receives the execution start command. The notice to notify the communication controller 52 that the execution start command is received from the command receiving unit 45. After receiving the notice from the command receiving unit 45, the terminating part 64 terminates the connection with the portable terminal 2 that has sent the execution start command. The connection with the portable terminal 2 is then terminated while the job is executed or is in the standby state at the image processing device 3. As a result, the channel for the communication by wireless may be unused. With the unused channel, the new connection request is allowed to be received, resulting in efficient use of the channels. After terminating the connection with the portable terminal 2, the terminating part 64 updates the connection status 55c in the job information 55 to "NO CONNECTION."

After the data is sent to the portable terminal 2 by the data transmission unit 50, the terminating part 64 terminates the connection with the portable terminal 2. To be more specific, when the unsent notice to the portable terminal 2 is stored, the establishing part 62 establishes the connection in response to the reconnection request from the portable terminal 2. After the connection is established, the data transmission unit 50 sends the notice to the portable terminal 2. After the notice is sent by the data transmission unit 50, the terminating part 64 terminates the connection with the portable terminal 2 so that the channel for the communication by wireless may be unused. The scan data may be generated through the execution of the scan job. In this case, if the connection is established in response to the reconnection request from the portable terminal 2, the data transmission unit 50 sends the scan data to the portable terminal 2. After the scan data is sent by the data transmission unit 50, the terminating part 64 terminates the connection with the portable terminal 2.

The CPU 40 may serve as the authentication part 54 that performs a user authentication of the user of the portable terminal 2 which sent the connection request to the image processing device 3. After receiving the connection request from the portable terminal 2, the authentication part 54 reads the terminal ID of the portable terminal 2 in the connection request and queries an authentication information database 35 in the storage 34, for instance, thereby performing the user authentication. The authentication part 54 may request the user who operates the portable terminal 2 to input the terminal ID. Also, the authentication part 54 may request the user who operates the portable terminal 2 to input the password in addition to the terminal ID. Information such as that about the user and/or authentication information relating to the function of the image processing device 3 available for the user is linked to the terminal ID or the password and registered with the authentication information database 35. After completion of the user authentication, the authentication part 54 updates the user name 55b in the job information 55. Even when the user authentication results in failure, the connection with the image processing device 3 still may be established. In such a case, the user name is not applied to the user name 55b.

A flow of the communication between the portable terminal 2 and the image processing device 3 according to one or more embodiments of the invention is explained next. FIG. 5 shows an example of a timing chart showing the communication flow between the portable terminal 2 and the image processing device 3 for executing the print job according to one or more embodiments of the invention. Together with starting the portable terminal 2 up (process P1), the image processing device 3 is started up (process P2). In response to detecting the image processing device 3 (process P4), the portable terminal 2 sends the connection request based on the inputs by the user through the manipulation unit 17 (process P6). The image processing device 3 confirms the unused channel in the wireless communication interface 32. The image processing device 3 establishes the connection when admitting the connection request for sending the new job (process P8). Also, the image processing device 3 sends the connection admission to the portable terminal 2 (process P10).

The portable terminal 2 runs the application in response to the input by the user through the manipulation unit 17 (process P12). After running the application, the portable terminal 2 displays the screen to configure the settings about the job on the display unit 19. As displaying the screen, the portable terminal 2 generates the job to enable the image processing device 3 to execute in response to the input by the user through the manipulation unit 17. The timing to run the application may be prior to the timing to establish the connection between the portable terminal 2 and the image processing device 3 (process P8). After running the application, the portable terminal 2 sends the authentication information for the user authentication to the image processing device 3 (process P14). In response to receiving the authentication information, the image processing device 3 refers to the authentication information database 35, and sends an authenticated notice to the portable terminal 2 if the authentication results in success (process P18). The portable terminal 2 sends the job request to request the execution of the job when the job to which the settings configured by the user are applied is generated (process P20). It is to confirm whether or not the user is authorized to use the particular settings such as printing in color and/or printing in both sides, for example. After receiving the job request, the image processing device 3 refers to authority information included in the authentication information database 35 (process P22). If the function is authorized to the user, the image processing device 3 sends the job admission to the portable terminal 2 (process P24). In response to receiving the job admission, the portable terminal 2 sends the job data formed from the execution start command to start the execution of the job and the document data to print (process P26).

After receiving the job data (process P28), the image processing device 3 generates and registers the job information 55 (process P20). In response to receiving the job data, the image processing device 3 sends the termination notice to notify the portable terminal 2 of the termination of the connection (process P32). The image processing device 3 then terminates the connection (process P34). When it is the time to start the execution of the job, the image processing device 3 starts executing the job (process P36). After receiving the termination notice from the image processing device 3, the portable terminal 2 starts sending the reconnection request to the image processing device 3 on a periodical basis (process P38). When receiving the reconnection request, the image processing device 3 refers to the job information 55 (process P40). If the notice to the portable terminal 2 is not stored, the image processing device 3 refuses the reconnection request and sends the connection refusal to the portable terminal 2 (process P42). If any error occurs during the execution of the job (process P44), the image processing device 3 generates the error notice to the portable terminal 2 (process P46). Also, the image processing device 3 updates the notice information 55g to "YES" in the job information 55 (process P48).

The reconnection request is sent from the portable terminal 2 to the image processing device 3 after the error notice is generated (process P50). In this case, the image processing device 3 refers to the job information 55 (process P52) to confirm the notice is stored. The image processing device 3 then establishes the connection (process P54). The image processing device 3 sends the connection admission to the portable terminal 2 (process P56) to send the error notice (process P58). In response to receiving the connection admission (process P56), the portable terminal 2 stops sending the reconnection request. The image processing device 3 sends the error notice, and terminates the connection with the portable terminal 2 (process P60). After receiving the error notice (process P62), the portable terminal 2 displays an error message corresponding to the error notice on the display unit 19 to let the user recognize the occurrence of the error. The image processing device 3 terminates the connection after receiving the job data (process P34). Then, the image processing device 3 is allowed to have the channel used for the connection with another portable terminal 2 from termination of the connection to the reconnection of the connection in response to the reconnection request (process P54) (time t1). The portable terminal 2 sends the reconnection request to the image processing device 3 on a periodical basis from receiving the termination notice from the image processing device 3 (process P32) to receiving the connection admission (process P82) (time t2). When the notice to the portable terminal 2 is generated at the image processing device 3, the image processing device 3 thus is allowed to establish the connection with the portable terminal 2 appropriately to send the notice to the portable terminal 2.

FIG. 6 shows an example of a timing chart showing the communication flow between the portable terminal 2 and the image processing device 3 for executing the print job according to one or more embodiments of the invention. The communications in processes P1 to P42 in FIG. 6 are the same as ones explained in FIG. 5, and these are not discussed repeatedly for the same description. After completing the execution of the print job (process P70), the image processing device 3 generates the completion notice (process P72), and updates the notice information 55g to "YES" in the job information 55 (process P74). The reconnection request may be sent from the portable terminal 2 after the completion notice is generated (process P76). In this case, the image processing device 3 refers to the job information 55 to confirm that the notice information 55g shows "YES" (process P78), and establishes the connection (process P80). The image processing device 3 sends the connection admission to the portable terminal 2 (process P82) and sends the job completion notice (process P84). After sending the job completion notice, the image processing device 3 terminates the connection with the portable terminal 2 (process P86). The portable terminal 2 received the job completion notice (process P88) displays the completion notifying screen to notify the user of the completion of the job on the display unit 19 (process P90). The portable terminal 2 thus is allowed to notify the user that the printed output, for instance, produced at the image processing device 3 can be obtained. The portable terminal 2 completes the application which was being run for the execution of the job in response to the completion of the job normally (process P92).

FIG. 7 shows an example of a timing chart showing the communication flow between the portable terminal 2 and the image processing device 3 for executing the scan job according to one or more embodiments of the invention. The communications in processes P1 to P24 in FIG. 6 are the same as ones explained in FIGS. 5 and 6, and these are not discussed repeatedly for the same description. In response to receiving a job admission, the portable terminal 2 sends the execution start command to execute the scan job to the image processing device 3 (process P100). The image processing device 3 receives the execution start command from the portable terminal 2 (process P102). The image processing device 3 generates and registers the job information 55 (process P104). The image processing device 3 then notify the portable terminal 2 of the termination of the connection (process P106), and terminates the connection (process P108).

When it is the time that the execution of the scan job is allowed, the image processing device 3 starts reading the document placed on the position of the document (process P110). The portable terminal 2 sends the reconnection request to the image processing device 3 on a periodical basis from receiving the termination notice (process P106) to receiving the connection admission (process P130) (time t2). The portable terminal 2 sends the reconnection request at a predetermined timing during the execution of the job (process P112). In this case, the image processing device 3 refers to the job information 55 (process P114), and confirms that the document reading has not been complete yet. The image processing device 3 then sends the connection refusal to the portable terminal 2 (process P116). After completing the document reading (process P118) and generating the scan data based on the read document (process P120), the image processing device 3 updates the job status 55f to "complete normally" in the job information 55 (process P122). The image processing device 3 may receive the reconnection request from the portable terminal 2 (process P124). In this case, the image processing device 3 refers to the job information 55 (process P126) to confirm that the scan job is complete normally. The image processing device 3 then establishes the connection (process P128), and sends the connection admission to the portable terminal 2 (process P130). The image processing device 3 sends the generated scan data to the portable terminal 2 (process P132), then terminates the connection (process P134). The portable terminal 2 received the scan data (process P136) stores the received scan data or sends it to another device over the network. The portable terminal 2 completes the application which was being run for the execution of the scan job (process P138). In the timing charts of FIGS. 5 to 7, the user authentication is performed. If the connection is established, the execution start command may be sent without the user authentication. In such a case, the process in processes P4 to P24 in FIGS. 5 to 7 is not performed.

Figure 8:
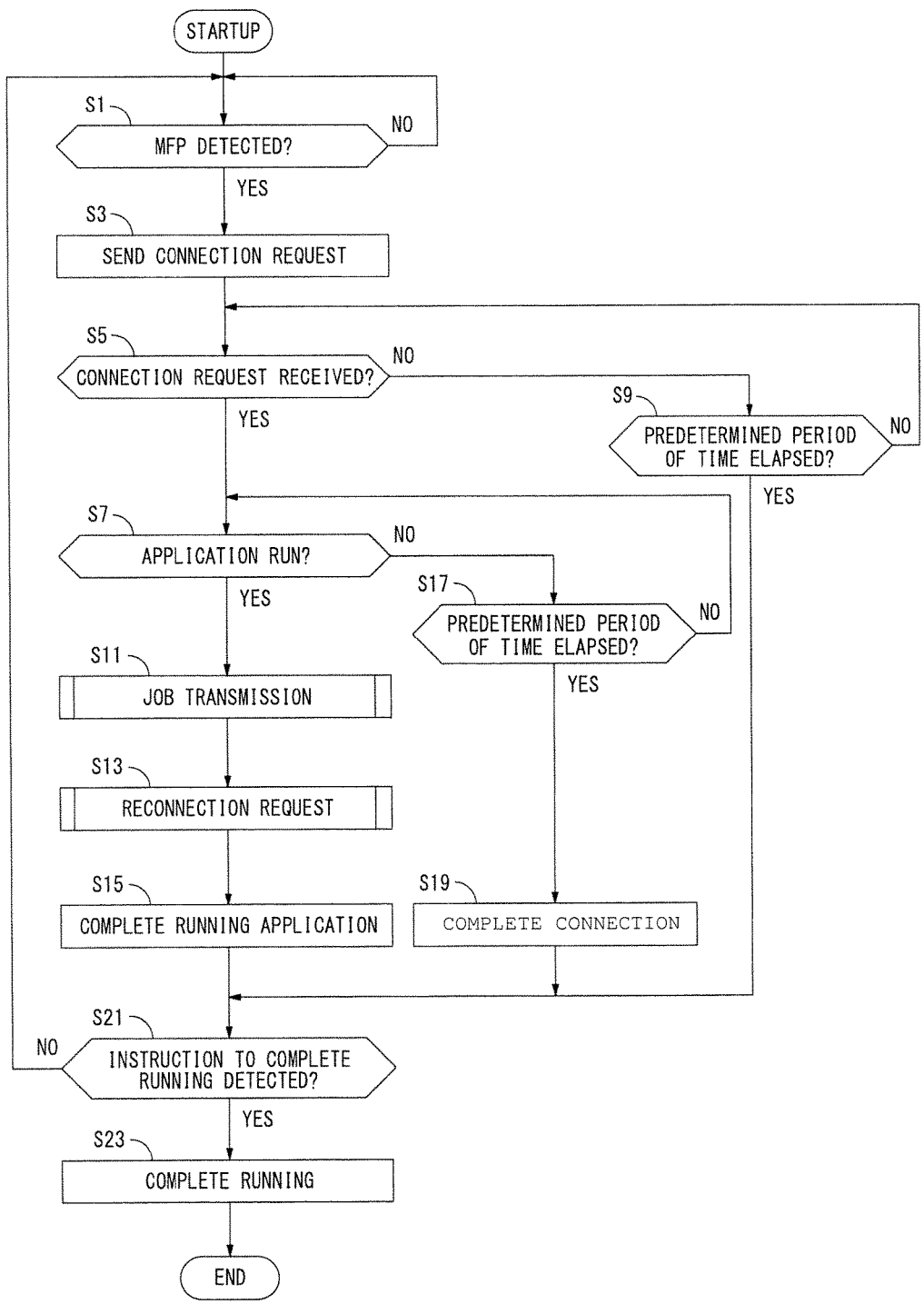
FIG. 8 is a flow diagram explaining an exemplary sequential procedure of the main process performed at the portable terminal according to one or more embodiments of the invention.

The sequential procedure of the process performed at the portable terminal 2 and the image processing device 3 is explained next. FIG. 8 is a flow diagram explaining an exemplary sequential procedure of the main process performed at the portable terminal 2 according to one or more embodiments of the invention. Upon startup of the operation system (OS) of the portable terminal 2, the portable terminal 2 determines whether or not the image processing device 3 within the predetermined distance from itself is detected (step S1). The portable terminal 2 may not determine that the image processing device 3 is not detected (when a result of step S1 is NO). In this case, the portable terminal 2 waits until detecting the image processing device 3. The portable terminal 2 may determine that the image processing device 3 is detected (when a result of step S1 is YES). In this case, the portable terminal 2 further determines if the connecting instruction from the user is detected (step S2). When detecting the image processing device 3, the portable terminal 2 may display that the image processing device 3 is detected on the display unit 19. The user gives the connecting instruction through the manipulation unit 17 as the screen to give the connecting instruction to the image processing device 3 is displayed on the display unit 19. The portable terminal 2 may determine the connecting instruction from the user is detected (when a result of step S2 is YES). In this case, the portable terminal 2 sends the connection request to the image processing device 3 thereby detected (step S3).

After sending the connection request, the portable terminal 2 determines whether or not the connection admission is received from the image processing device 3 (step S5). When determining that the connection admission is received (when a result of step S5 is YES), the portable terminal 2 determines whether or not to run the application in response to the user operation (step S7). After detecting the predetermined user operation, the portable terminal 2 determines to run the application. For determining to run the application (when a result of step S7 is YES), the portable terminal 2 runs the application to perform a job transmission to send the predetermined job to the image processing device 3 (step S11). The detail of the job transmission is explained later. When determining that the connection admission is not received in step S5 (when a result of step S5 is NO), the portable terminal 2 determines if the predetermined period of time has elapsed (step S9). If determining that the predetermined period of time has not been elapsed (when a result of step S9 is NO), the portable terminal 2 waits until receiving the connection admission.

The portable terminal 2 performs the job transmission (step S11) to send the job to the image processing device 3. The portable terminal 2 then performs a reconnection request process to send the reconnection request to the image processing device 3 (step S13). The detail of the reconnection request is explained later. In the reconnection request, the portable terminal 2 sends a restart request to the image processing device 3 on a periodical basis, and repeats sending the restart request until receiving the data about the job such as the notice, for instance, from the image processing device 3. After performing the reconnection request (step S13), the portable terminal 2 completes running the application (step S15). For determining not to run the application for execution of the predetermined job in step S7 (when a result of step S7 is NO), the portable terminal 2 determines if the predetermined period of time has elapsed (step S17). If determining the predetermined period of time has not elapsed (when a result of step S17 is NO), the portable terminal 2 waits until running of the application. If determining the predetermined period of time has elapsed (when a result of step S17 is YES), the OS of the portable terminal 2 terminates the connection with the image processing device 3 due to timeout and completes (step S19).

The portable terminal 2 determines if the instruction to complete running of the OS is detected (step S21). The portable terminal 2 may determine the instruction is detected (when a result of step S21 is YES). In this case, the portable terminal 2 performs the process to complete the running of the OS (step S23), and completes the process. The portable terminal 2 may determine the instruction is not detected (when a result of step S21 is NO). In this case, the portable terminal 2 returns to the process in step S1 to repeat the process from step S1. The portable terminal 2 may determine the predetermined period of time has elapsed without receiving the connection admission from the image processing device 3 in step S9 (when a result of step S9 is YES). In this case, the portable terminal 2 performs the process in step S21.

Figure 9:
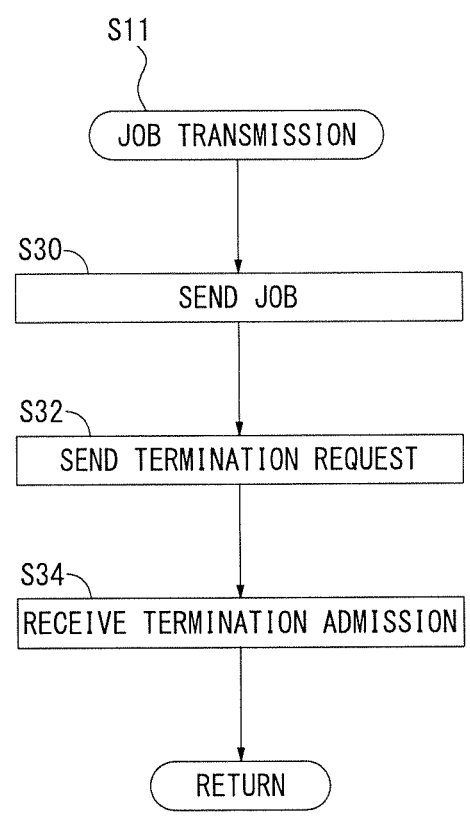
FIG. 9 is a detailed flow diagram explaining an exemplary sequential procedure of a job transmission according to one or more embodiments of the invention.

FIG. 9 is a detailed flow diagram explaining an exemplary sequential procedure of the job transmission (step S11 of FIG. 8) according to one or more embodiments of the invention. The portable terminal 2 generates the job based on the user input through the manipulation unit 17. The portable terminal 2 sends the generated job to the image processing device 3 (step S30). After sending the job, the portable terminal 2 sends the termination request to request the image processing device 3 to terminate the connection (step S32). The portable terminal 2 then receives the termination admission from the image processing device 3 (step S34), and completes the job transmission. In the example of FIG. 9, the termination request is sent from the portable terminal 2 to the image processing device 3. The termination request, however, is not necessarily sent from the portable terminal 2.

Figure 10:
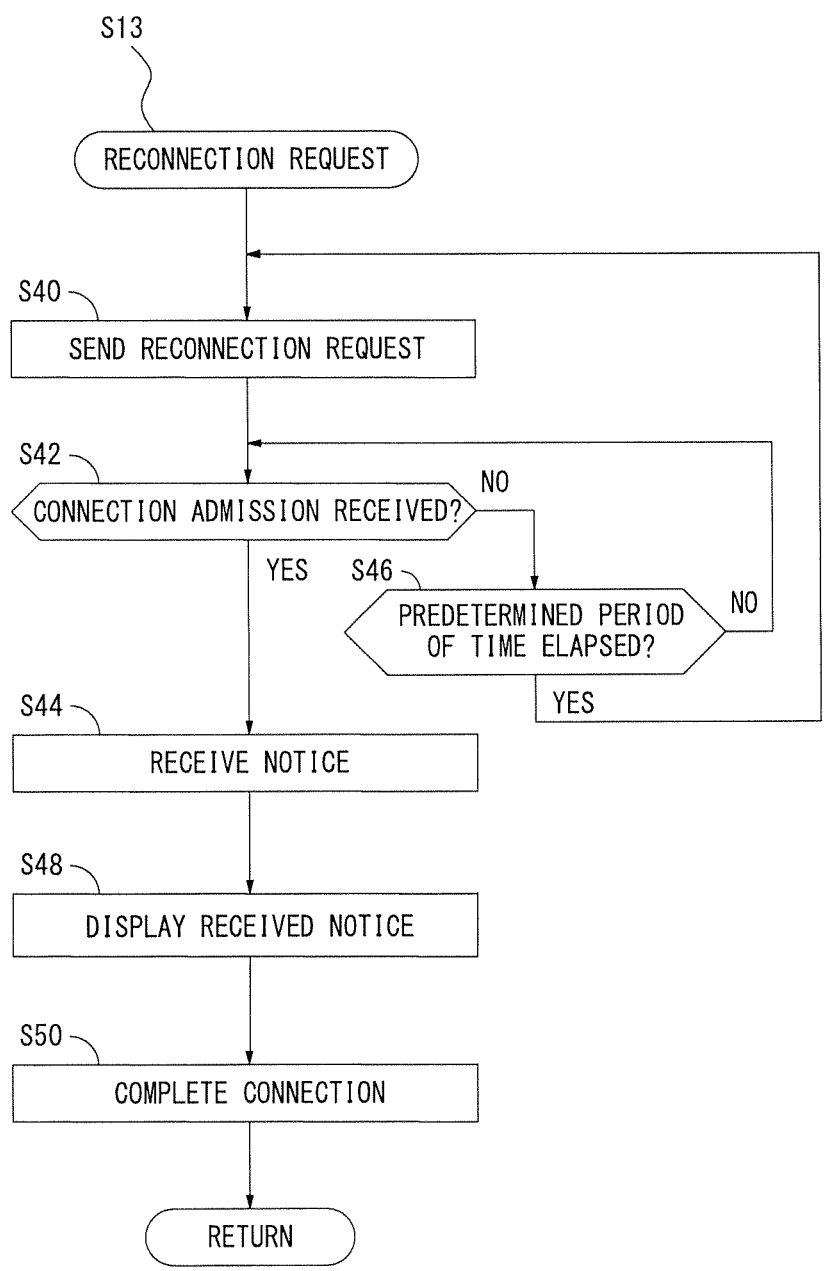
FIG. 10 is a detailed flow diagram explaining an exemplary sequential procedure of a reconnection request according to one or more embodiments of the invention.

FIG. 10 is a detailed flow diagram explaining an exemplary sequential procedure of the reconnection request (step S13 of FIG. 8) according to one or more embodiments of the invention. It is assumed for example the connection is terminated after the job is sent to the image processing device 3. In this case, the portable terminal 2 sends the reconnection request to the image processing device 3. As described earlier, the job ID is attached to the connection request, for example, and the reconnection request is generated. The portable terminal 2 determines if the connection admission is received from the image processing device 3 (step S42). For determining that the connection request is received (when a result of step S42 is YES), the portable terminal 2 receives the notice, for instance, from the image processing device 3 (step S44). The execution of the print job is complete normally, for example. In this case, the portable terminal 2 receives the job completion notice from the image processing device 3. The execution of the scan job is complete normally, for example. In this case, the portable terminal 2 receives the scan data generated through the execution of the scan job from the image processing device 3. The portable terminal 2 displays the received notice on the display unit 19 (step S48), and completes the communications with the image processing device 3 (step S50). The connection may be terminated from the image processing device 3 not from the portable terminal 2, which is different from the example of FIG. 10.

The portable terminal 2 determines if the execution of the job is complete (step S52). When receiving the job completion notice or the scan data from the image processing device 3, the portable terminal 2 determines that the execution of the job is complete. When receiving the error notice from the image processing device 3, the portable terminal 2 determines that the execution of the job has not been complete yet. After determining that the execution of the job is complete (when a result of step S52 is YES), the portable terminal 2 completes the reconnection request. When determining that the execution of the job is not complete (when a result of step S52 is NO), the portable terminal 2 returns again to the process in step S40 and repeats the process from step S40. Even when determining that the execution of the job is not complete, the portable terminal 2 may detect the user instruction to complete the execution of the job. In such a case, the portable terminal 2 completes the running of the application (step S15 of FIG. 8) after completing the reconnection request.

When the connection request is not received from the image processing device 3 in step S42, the portable terminal 2 determines if the predetermined period of time has elapsed (step S46). If determining the predetermined period of time has not elapsed (when a result of step S46 is NO), the portable terminal 2 waits until receiving the connection admission. After the predetermined period of time has elapsed (when a result of step S46 is YES), the portable terminal 2 returns to step S40 to send the reconnection request to the image processing device 3.

Figure 11:
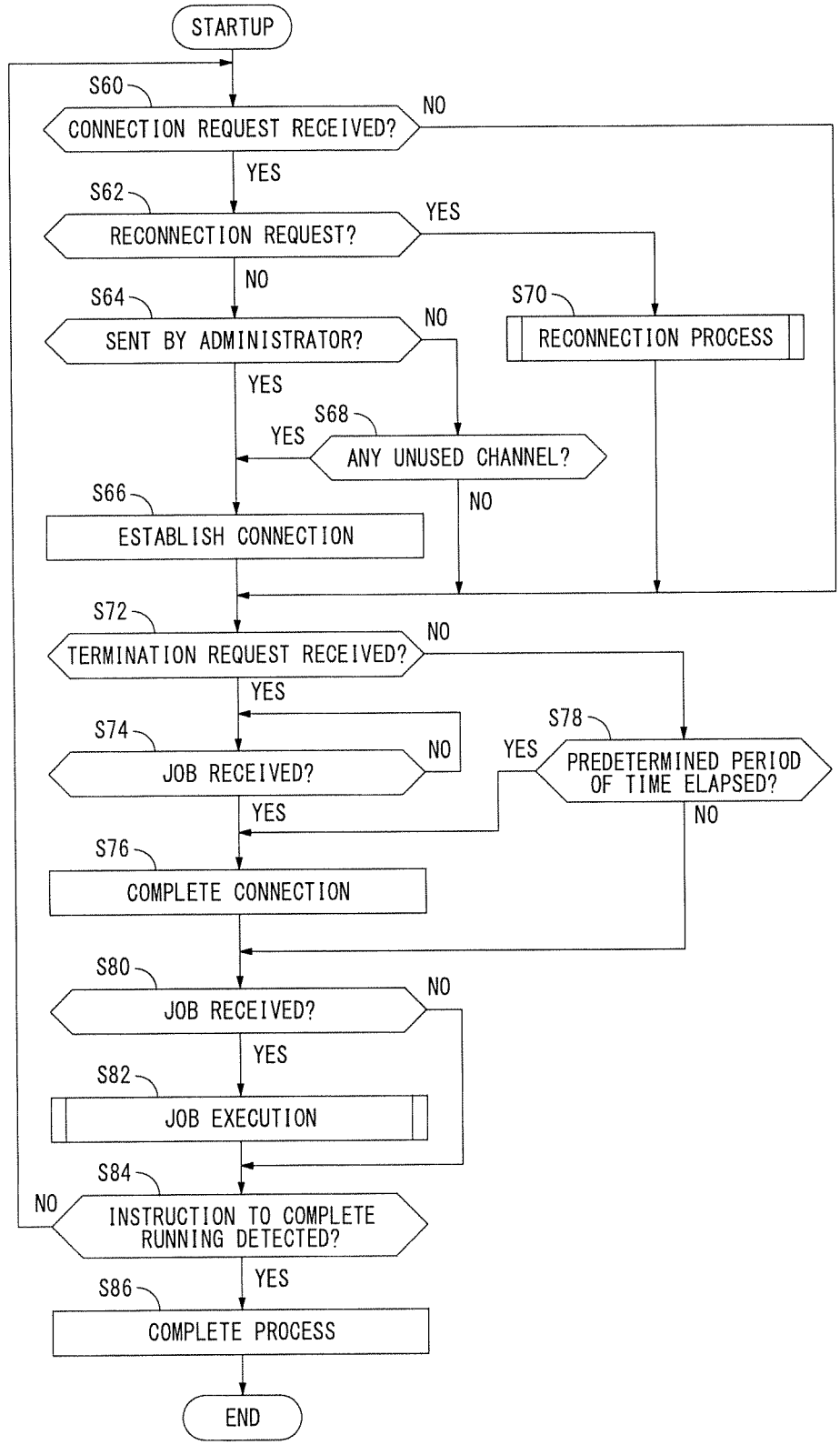
FIG. 11 is a flow diagram explaining an exemplary sequential procedure of the main process performed at the image processing device according to one or more embodiments of the invention.

FIG. 11 is a flow diagram explaining an exemplary sequential procedure of the main process performed at the image processing device 3 according to one or more embodiments of the invention. Upon startup, the image processing device 3 determines whether or not the connection request is received from the portable terminal 2 (step S60). When determining the connection request is received (when a result of step S60 is YES), the image processing device 3 determines if the received connection request is the reconnection request (step S62). The image processing device 3 may determine the received connection request is not the reconnection request (when a result of step S62 is NO). In this case, the image processing device 3 reads the connection request and determines the sender of the connection request is the administrator (step S64). The terminal ID of the portable terminal used by the administrator is stored in advance in the storage 42. When determining the sender is the administrator (when a result of step S64 is YES), the image processing device 3 establishes the connection (step S66). When determining the sender is not the administrator (when a result of step S64 is NO), the image processing device 3 confirms if there is any unused channel in the wireless communication interface 32 (step S68). If more than the predetermined number of all channels is used for the connection with the portable terminals 2, the image processing device 3 determines there is no unused channel. If less than the predetermined number of all channels is used for the connection with the portable terminals 2, the image processing device 3 determines there is the unused channel.

The image processing device 3 may determine the received connection request is the reconnection request in step S62 (when a result of step S62 is YES). In this case, the image processing device 3 performs a reconnection process (step S70). The detail of the reconnection process is explained later. The image processing device 3 determines if the termination request is received (step S72). When determining the termination request is received (when a result of step S72 is YES), the image processing device 3 determines whether or not the job is received from the portable terminal 2 (step S74). To be more specific, the image processing device 3 determines if it is not during the receipt of the job from the portable terminal 2. If determining the receipt of the job is not complete (when a result of step S74 is NO), the image processing device 3 waits until the receipt of the job completes. The image processing device 3 may determine the receipt of the job is complete (when a result of step S74 is YES). In this case, the image processing device 3 terminates the connection with the portable terminal 2 (step S76). When determining the termination request is not received in step S72 (when a result of step S72 is NO), the image processing device 3 determines whether or not the predetermined period of time has elapsed (step S78). If determining the predetermined period of time has elapsed (when a result of step S78 is YES), the image processing device 3 terminates the connection with the portable terminal 2 (step S76). If determining the predetermined period of time has not elapsed (when a result of step S78 is NO), the image processing device 3 skips the process in step S76 and does not terminate the connection. Even when the termination request is received, the image processing device 3 may determine the receipt of the job is complete. In such a case, the image processing device 3 may terminate the connection. The image processing device 3, in this case, does not perform the processes in steps S72 and S78 in FIG. 11.

The image processing device 3 determines whether or not the job is received from the portable terminal 2 (step S80). The job may be received (when a result of step S80 is YES). In this case, the image processing device 3 performs a job execution to execute the job (step S82). The detail of the job execution is explained later. The job may not be received (when a result of step S80 is NO). In this case, the image processing device 3 skips the job execution. The image processing device 3 determines whether or not the instruction to complete running is detected (step S84). For determining the instruction to complete running is detected (when a result of step S84 is YES), the image processing device 3 performs the process to complete the image processing device 3 and completes the process (step S86). For determining the instruction to complete running is not detected (when a result of step S84 is NO), the image processing device 3 returns to step S60 to repeat the process in steps S60 to S84 until detecting the instruction to complete.

Figure 12:
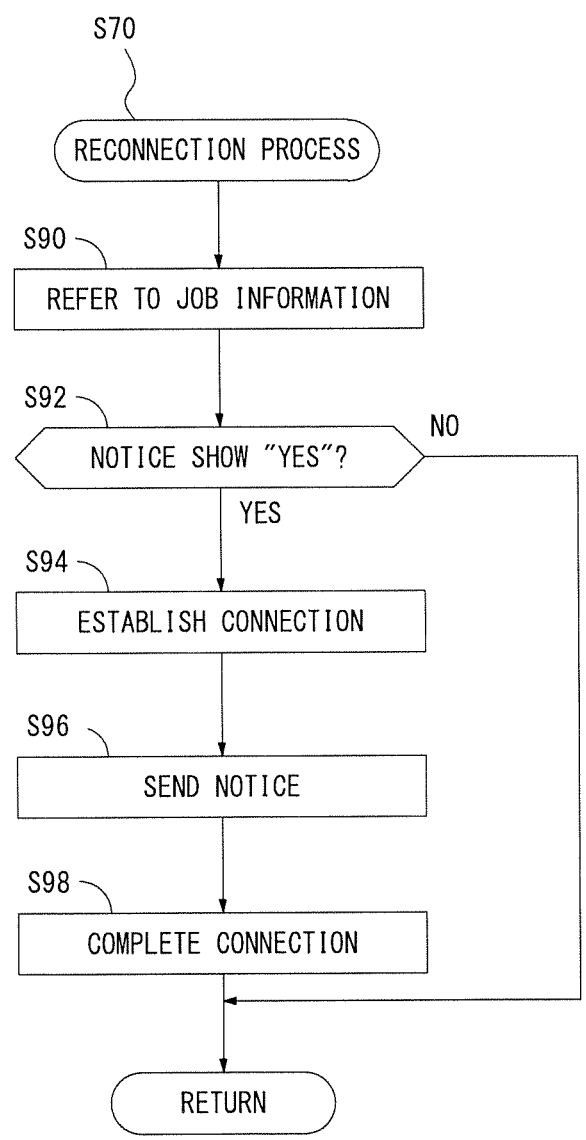
FIG. 12 is a detailed flow diagram explaining an exemplary sequential procedure of a reconnection process according to one or more embodiments of the invention.

FIG. 12 is a detailed flow diagram explaining an exemplary sequential procedure of the reconnection process (step S70 in FIG. 11) according to one or more embodiments of the invention. In response to receiving the reconnection request, the image processing device 3 refers to the job information 55 (step S90), and determines if the notice information 55g shows "YES" (step S92). If the notice information 55g shows "YES" (when a result of step S92 is YES), the image processing device 3 establishes the connection with the portable terminal 2 (step S94). After establishing the connection, the image processing device 3 sends the notice to the portable terminal 2 (step S96). The image processing device 3 terminates the connection after sending the notice (step S98). If the notice information 55g does not show "YES" in step S92 (when a result of step S92 is NO), the image processing device 3 skips the process in steps S94 to S98 and completes the reconnection process. For the scan job, the image processing device 3 determines if the job is executed normally in step S92. When the job is executed normally, the image processing device 3 establishes the connection to send the scan data to the portable terminal 2.

FIG. 13 is a detailed flow diagram explaining an exemplary sequential procedure of the job execution (step S82 in FIG. 11) according to one or more embodiments of the invention. The image processing device 3 determines whether or not it is the timing to start the execution of the job received from the portable terminal 2 (step S100). The jobs are executed in order of receiving. If the execution of the earlier job is complete, the image processing device 3 determines it is the timing to start the execution of the job. Even when the execution of the earlier job is complete, the image processing device 3 may have the interrupt process such as the image stabilization performed at the image processing device 3 at the predetermined timing. In this case, the image processing device 3 determines it is not the timing to start the execution of the job. When determining it is the timing to start the execution of the job in step S100 (when a result of step S100 is YES), the image processing device 3 starts executing the job. When determining it is not the timing to start the execution of the job (when a result of step S100 is NO), the image processing device 3 determines if it is during the execution of the job (step S106) because the timing to start the execution of the job has already arrived. The image processing device 3 may determine it is during the execution of the job (when a result of step S106 is YES). In this case, the image processing device 3 skips the process in step S102. The image processing device 3 may determine it is not during the execution of the job (when a result of step S106 is NO). In this case, the image processing device 3 determines that the job has not been executed and is in the standby state. The image processing device 3 completes the job execution without performing the process explained next.

The image processing device 3 then determines if the execution of the job is complete (step S104). When determining the execution of the job is complete (step S104 is YES), the image processing device 3 generates the completion notice to notify that the job is executed normally (step S108), and updates the job information 55 (step S110). When determining the execution of the job is not complete (step S104 is NO), the image processing device 3 determines if any error has occurred during the execution of the job (step S112). For determining some kind of error has occurred during the execution of the job (when a result of step S112 is YES), the image processing device 3 generates the error notice to the portable terminal 2 (step S114). The image processing device 3 generates the notice to the portable terminal 2 corresponding to the job. The image processing device 3 may generate the notice to the portable terminal 2 corresponding to the standby job. Alternatively, the image processing device 3 may generate the notice to the portable terminal 2 corresponding to the job the same type as for the standby job. In order to notify the administrator of the occurrence of the error, the image processing device 3 generates the notice to the portable terminal 2 used by the administrator. For determining no error has occurred during the execution of the job (when a result of step S112 is NO), the image processing device 3 completes the job execution.

When the error occurs, the image processing device 3 sends the connection request to the portable terminal 2 used by the administrator (step S116). The image processing device 3 determines whether or not the connection with the portable terminal 2 used by the administrator is established (step S118). For determining the connection is established (when a result of step S118 is YES), the image processing device 3 sends the error notice to the administrator (step S120), and terminates the connection after sending the notice (step S122). For determining the connection is not established (when a result of step S118 is NO), the image processing device 3 determines if the predetermined period of time has elapsed (step S124). When the predetermined period of time has elapsed (when a result of step S124 is YES), the image processing device 3 updates the job information 55 and competes the job execution as the connection with the portable terminal 2 used by the administrator is not established. When the predetermined period of time has not elapsed (when a result of step S124 is NO), the image processing device 3 waits until the connection is established.

As described above, after receiving the execution start command to execute the job from the portable terminal 2, the image processing device 3 terminates the connection with the portable terminal 2. As a result, the channel is unused during the execution of the job and the standby time of the job at the image processing device 3, resulting in efficient use of the channel.

As described above, when the notice to the portable terminal 2 is stored, the image processing device 3 establishes the connection in response to the reconnection request from the portable terminal 2. As a result, the image processing device 3 is allowed to send the notice to the portable terminal 2. If no notice to the portable terminal 2 is stored, the image processing device 3 refuses the reconnection request from the portable terminal 2. The image processing device 3 then does not establish the connection if there is no need to send the notice to the portable terminal 2, and there will be the unused channel.

As described above, after receiving the execution start command of the job from the portable terminal, the image processing device terminates the connection with the portable terminal. The connection between the image processing device and the portable terminal is not maintained while the job is executed at the image processing device. Once the connection is terminated by the image processing device, the connection between the portable terminal of the user who would like to make the image processing device execute the new job and the image processing device may be established. Hence, the efficient use of the wireless communication channel may be enhanced.

(Modifications)

While one or more embodiments of the present invention has been described above, the present invention is not limited to the embodiments. Various modifications may be applied to the present invention.

In the above-described embodiments, when the connection request is received from the portable terminal 2 used by the administrator, the image processing device 3 always establishes the connection. On the other hand, when the connection request is received from the portable terminal 2 other than the one used by the administrator, the image processing device 3 establishes the connection only if there is the unused channel. The image processing device 3 may always establish the connection regardless of whether the connection request is from the portable terminal 2 used by the administrator.

In the above-described embodiments, when the error occurs during the execution of the job, or when the job is executed normally, the image processing device 3 generates the notice to the portable terminal 2. However, this is given not for limitation. When the execution of the job is interrupted due to the process such as the image stabilization during the execution of the job, the image processing device 3 may generate the notice to the portable terminal 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claim is:

1. An image processing system comprising:
    a portable terminal; and
    an image processing device that wirelessly communicates with the portable terminal, wherein
    the portable terminal comprises a first central processing unit (CPU) that:
        sends a connection request to the image processing device to request to establish a connection with the image processing device; and
        sends an execution start command to enable the image processing device to execute a job when the connection with the image processing device is established, and
    the image processing device comprises:
        a wireless communication interface that establishes the connection with the portable terminal in response to the connection request from the portable terminal; and
        a second CPU that:
            receives the execution start command from the portable terminal;
            executes the job based on the execution start command in order of receipt;
            sends a termination notice to the portable terminal directly after the execution start command is received and registered; and
            terminates the connection with the portable terminal directly after sending the termination notice before execution of the job,
    wherein:
    the first CPU sends a reconnection request on a periodical basis to request the image processing device to establish the connection after the connection with the image processing device is terminated,
    the second CPU sends data about the job generated after the execution start command is received as the connection with the portable terminal is established, and
    the wireless communication interface establishes the connection with the portable terminal in response to the reconnection request from the portable terminal when the data has not been sent by the second CPU, and
    wherein:
    the image processing device further comprises multiple channels and uses each of the multiple channels to communicate with a single portable terminal,
    the image processing device simultaneously communicates with multiple portable terminals by using the respective multiple channels, and
    the wireless communication interface refuses the connection with the portable terminal in response to the connection request from a first portable terminal and establishes the connection with a second portable terminal in response to the reconnection request from the second portable terminal when the connections with the portable terminals are established with the channels after a total number of the channels is reduced to a predetermined number.

2. The image processing system according to claim 1, wherein
    the wireless communication interface establishes the connection without refusing the connection when the connection request is received from a third portable terminal used by a user different from a user of the first portable terminal.

3. The image processing system according to claim 1, wherein
    the second CPU monitors a progress of the job being executed, and
    the second CPU generates a notice relating to the job according to the progress of the job monitored.

4. The image processing system according to claim 3, wherein
    the wireless communication interface refuses the connection in response to the reconnection request from the portable terminal when the notice is not generated.

5. The image processing system according to claim 3, wherein
    the second CPU generates the notice to the portable terminal when an error has occurred during the execution of the job or when the execution of the job is complete.

6. The image processing system according to claim 3, wherein
    the image processing device further comprises a storage in which job information relating to the progress of the job executed in response to the execution start command is stored,
    the second CPU updates the job information based on the progress of the job, and
    the second CPU generates the notice by referring to the job information.

7. The image processing system according to claim 6, wherein
    the first CPU sends identification information that identifies the job corresponding to the execution start command together with the execution start command,
    the first CPU attaches the identification information to the connection request to generate the reconnection request,
    the job information stored in the storage includes the identification information, and
    the wireless communication interface determines whether the reconnection request or the connection request is received based on the identification information attached to the reconnection request by referring to the job information.

8. The image processing system according to claim 3, wherein
    the second CPU causes the execution of the job corresponding to the execution start command to be in a standby state depending on an execution status of the job, and the second CPU generates the notice to the portable terminal that sent the job placed in the standby state when an error has occurred during the execution of the job.

9. The image processing system according to claim 8, wherein
the second CPU generates the notice to the portable terminal that sent a job that is a same type as a job for which an error has occurred for other portable terminals.

10. The image processing system according to claim 1, wherein
the second CPU terminates the connection with the portable terminal after the data is sent to the portable terminal.

11. An image processing device that communicates with a portable terminal by wireless, comprising:
a wireless communication interface that establishes a connection with the portable terminal in response to a connection request from the portable terminal; and
a CPU that:
receives an execution start command from the portable terminal to start an execution of a job;
executes the job based on the execution start command in order of receipt;
sends a termination notification to the portable terminal directly after the execution start command is received and registered; and
terminates the connection with the portable terminal directly after sending the termination notice before execution of the job,
wherein:
the portable terminal sends a reconnection request on a periodical basis to request to establish the connection after the connection is terminated,
the CPU sends data about the job generated after the execution start command is received as the connection with the portable terminal is established, and
the wireless communication interface establishes the connection with the portable terminal in response to the reconnection request from the portable terminal when the data has not been sent, and
wherein:
the image processing device further comprises multiple channels and uses each of the multiple channels to communicate with a single portable terminal,
the image processing device simultaneously communicates with multiple portable terminals by using the respective multiple channels, and
the wireless communication interface refuses the connection with the portable terminal in response to the connection request from a first portable terminal and establishes the connection with a second portable terminal in response to the reconnection request from the second portable terminal when the connections with the portable terminals are established with the channels after a total number of the channels is reduced to a predetermined number.

12. The image processing device according to claim 11, wherein
the CPU monitors a progress of the job being executed, and
the CPU generates a notice relating to the job according to the progress of the job monitored.

13. The image processing device according to claim 12, wherein the CPU generates the notice to the portable terminal when an error has occurred during the execution of the job or when the execution of the job is complete.

14. The image processing device according to claim 12, wherein
the CPU causes the execution of the job corresponding to the execution start command to be in a standby state depending on an execution status of the job, and
the CPU generates the notice to the portable terminal that sent the job placed in the standby state when an error has occurred during the execution.

15. A non-transitory computer readable recording medium storing a program to be executed by an image processing device that communicates with a portable terminal by wireless, wherein execution of the program by the image processing device causes the image processing device to execute the following:
establishing a connection with the portable terminal in response to a connection request from the portable terminal;
receiving an execution start command from the portable terminal to start execution of a job;
executing the job based on the execution start command in order of receipt;
sending a connection termination notice to the portable terminal directly after the execution start command is received and registered; and
terminating the connection with the portable terminal directly after sending the termination notice before execution of the job, wherein
the portable terminal sends a reconnection request on a periodical basis to request the image processing device to establish the connection after the connection with the image processing device is terminated,
execution of the program by the image processing device causes the image processing device to send data about the job generated after the execution start command is received as the connection with the portable terminal is established,
the connection with the portable terminal is established in response to the reconnection request from the portable terminal when the data has not been sent,
the image processing device further comprises multiple channels and uses each of the multiple channels to communicate with a single portable terminal,
the image processing device simultaneously communicates with multiple portable terminals by using the respective multiple channels, and
the connection with the portable terminal is refused in response to the connection request from a first portable terminal and the connection with a second portable terminal is established in response to the reconnection request from the second portable terminal when the connections with the portable terminals are established with the channels after a total number of the channels is reduced to a predetermined number.

16. The non-transitory computer readable recording medium according to claim 15, wherein
execution of the program by the image processing device causes the image processing device to further execute the following:
monitoring a progress of the job executed; and
generating a notice relating to the job according to the progress of the job monitored.

* * * * *